US012711301B2

(12) United States Patent
Kubo et al.

(10) Patent No.: US 12,711,301 B2
(45) Date of Patent: Aug. 18, 2026

(54) TASK SUPPORT SYSTEM, TASK SUPPORT METHOD, AND INFORMATION STORAGE MEDIUM

(71) Applicant: Cybozu, Inc., Tokyo (JP)

(72) Inventors: Kyosuke Kubo, Tokyo (JP); Takuya Kochiyama, Zushi (JP)

(73) Assignee: CYBOZU, INC., Tokyo (JP)

( * ) Notice: Subject to any disclaimer, the term of this patent is extended or adjusted under 35 U.S.C. 154(b) by 204 days.

(21) Appl. No.: 18/429,429

(22) Filed: Feb. 1, 2024

(65) Prior Publication Data

US 2024/0265192 A1 Aug. 8, 2024

(30) Foreign Application Priority Data

Feb. 2, 2023 (JP) ................................ 2023-014816

(51) Int. Cl.

*G06F 40/106* (2020.01)
*G06F 16/955* (2019.01)
*G06F 16/958* (2019.01)
*G06F 40/134* (2020.01)

(52) U.S. Cl.

CPC ........ *G06F 40/106* (2020.01); *G06F 16/9558* (2019.01); *G06F 16/986* (2019.01); *G06F 40/134* (2020.01)

(58) Field of Classification Search

CPC .. G06F 40/106; G06F 16/9558; G06F 16/986; G06F 40/134

USPC .......................................................... 715/208

See application file for complete search history.

(56) References Cited

U.S. PATENT DOCUMENTS 11,475,206 B1 * 10/2022 Smith .................... G06F 16/986
2004/0123238 A1 * 6/2004 Hefetz .................... G06F 9/451 715/234
2006/0005163 A1 * 1/2006 Huesken ................. G06F 9/465 717/107
2006/0242557 A1 * 10/2006 Nortis, III ............. G06F 40/177 715/738
2010/0318507 A1 * 12/2010 Grant ..................... G06Q 20/10 707/706
2012/0192063 A1 * 7/2012 Koren ................. G06F 16/9577 715/252
2012/0284290 A1 * 11/2012 Keebler ................ G06F 16/958 707/756

(Continued)

FOREIGN PATENT DOCUMENTS

JP 2005332151 A 12/2005
JP 2006185286 A 7/2006

OTHER PUBLICATIONS

Office Action of Apr. 23, 2024, for corresponding JP Patent Application No. 2023-014816 with partial translation, pp. 1-7.

(Continued)

*Primary Examiner* — Stephen S Hong

(74) *Attorney, Agent, or Firm* — HEA Law PLLC

(57) ABSTRACT

Provided is a task support system including at least one processor configured to: display a design designation page that allows a user to designate designs of links to task support pages afterward even without requiring the user to input code of a portal page including the links; acquire design data indicating the designs designated by the user on the design designation page; and create the portal page based on the design data.

12 Claims, 16 Drawing Sheets

(56) References Cited

U.S. PATENT DOCUMENTS

2013/0021346 A1* 1/2013 Terman .................... G09B 5/08
345/467
2016/0092404 A1* 3/2016 Farouki .................. G06F 9/451
715/202
2017/0249393 A1* 8/2017 Nair ........................ G06F 16/25
2020/0380061 A1* 12/2020 Saar ...................... G06F 40/166
2023/0144009 A1* 5/2023 Andersen ................ G06F 40/14
715/237

OTHER PUBLICATIONS

"You can create any content from blogs to highly functional websites," the Internet, retrieved on Dec. 12, 2022, [online], https://ja.wordpress.org/.

* cited by examiner

FIG.4
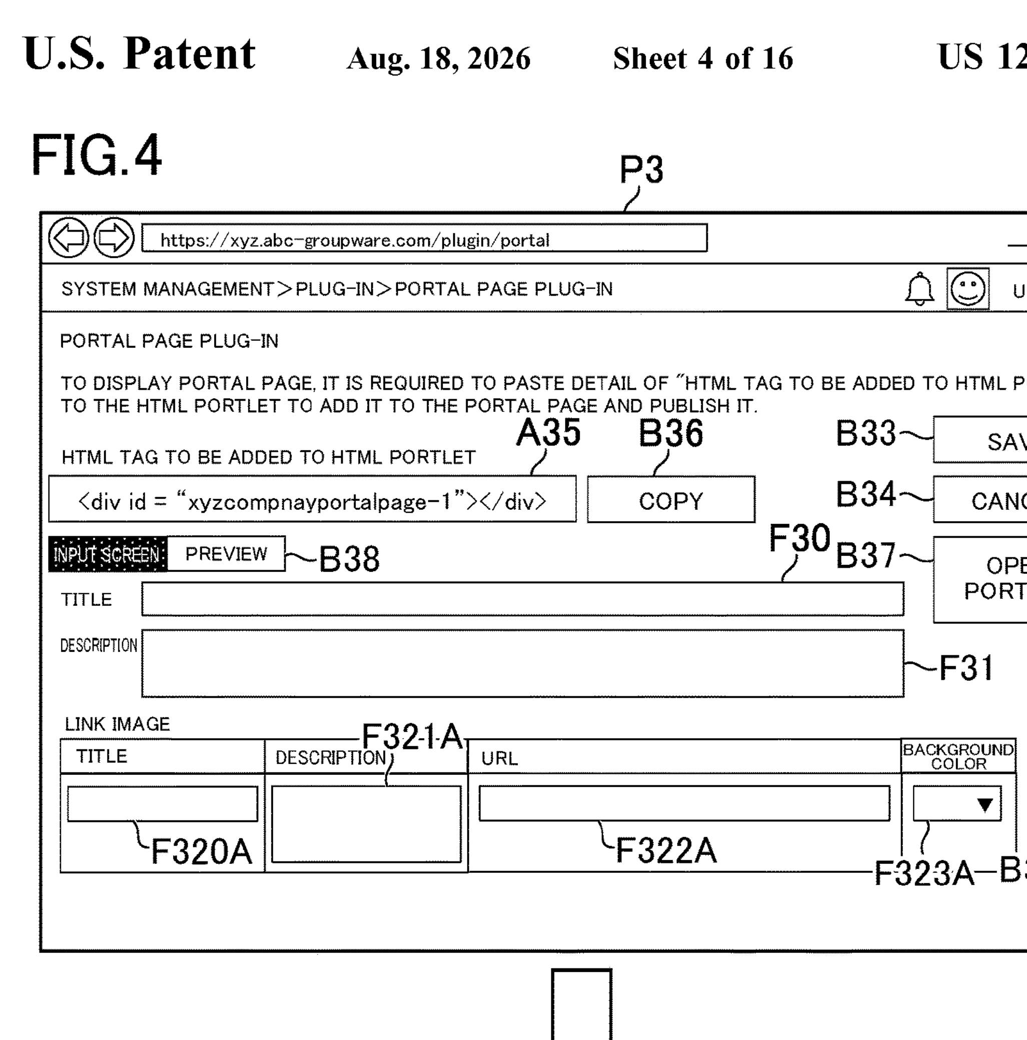
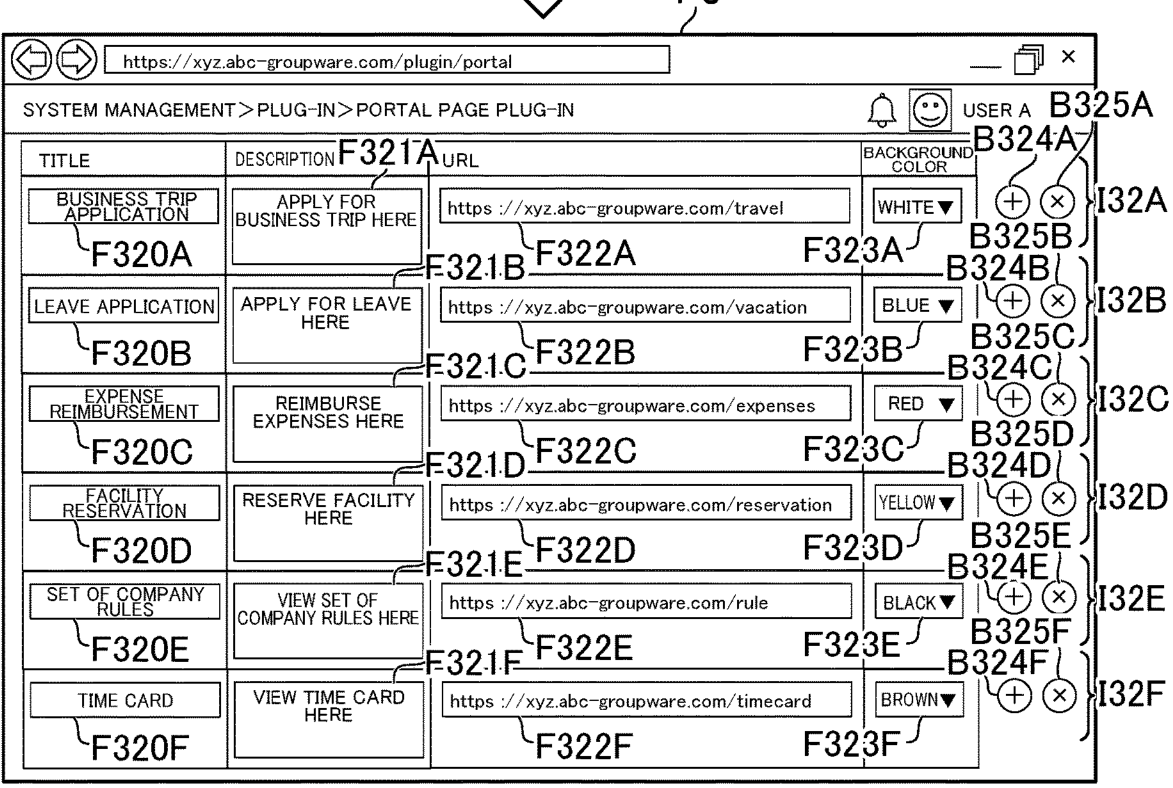

| ORGANIZATION DATA | PLUG-INS | HTML PORTLETS | HTML TAGS | PLUG-IN SETTING DATA |
|---|---|---|---|---|
| xyz CORPORATION | PORTAL PAGE PLUG-IN | HTML PORTLETS 1 | <div id = "xyzcompnayportalpage-1"></div> | PLUG-IN SETTING DATA 1 |
| | EMAIL FETCHING PLUG-IN | HTML PORTLETS 2 | <div id = "xyzcompnaymail-2"></div> | PLUG-IN SETTING DATA 2 |
| ⋮ | ⋮ | ⋮ | ⋮ | ⋮ |

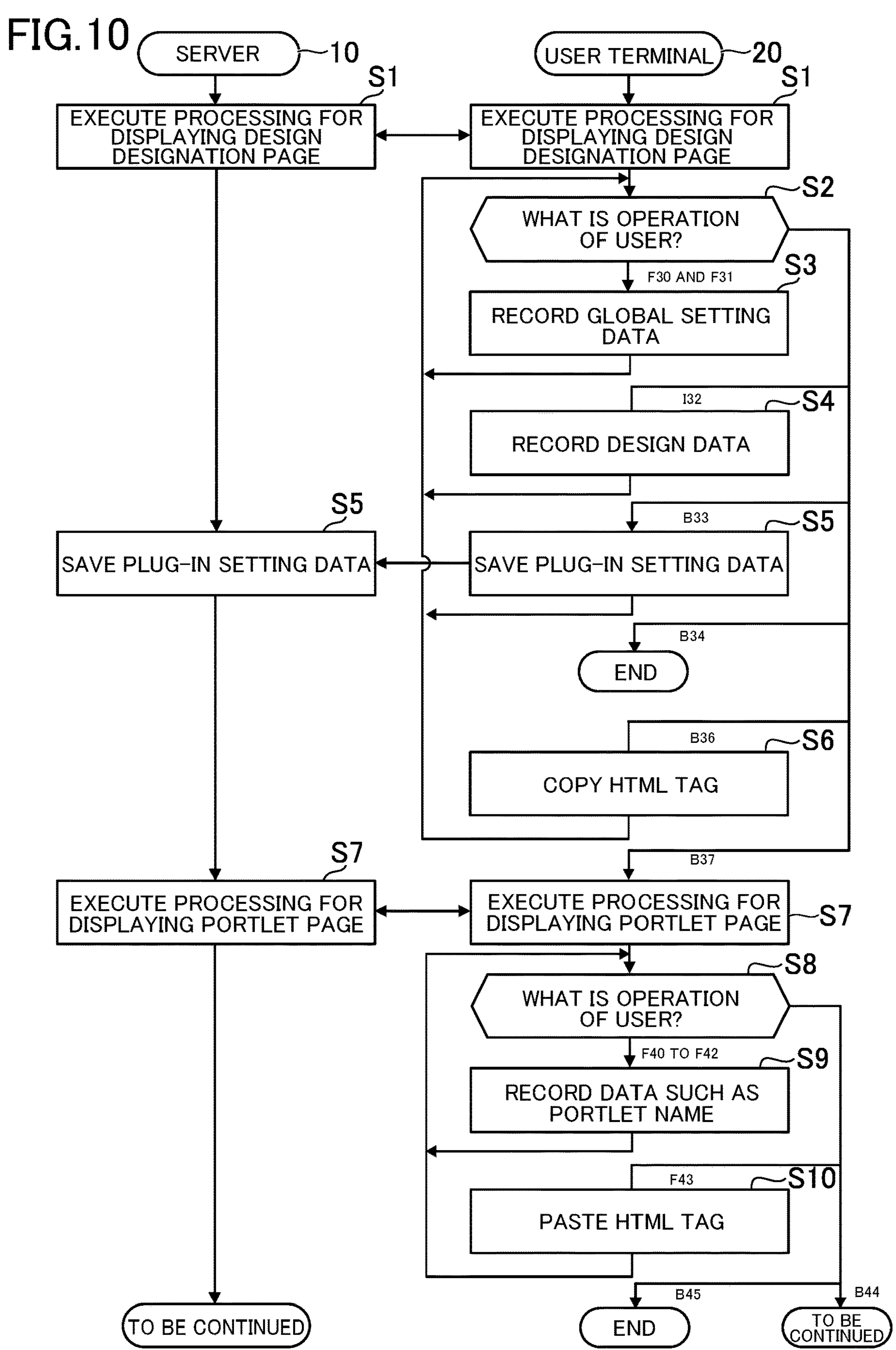
FIG.10
SERVER
10
USER TERMINAL
20
S1
EXECUTE PROCESSING FOR DISPLAYING DESIGN DESIGNATION PAGE
S1
EXECUTE PROCESSING FOR DISPLAYING DESIGN DESIGNATION PAGE
S2
WHAT IS OPERATION OF USER?
F30 AND F31
S3
RECORD GLOBAL SETTING DATA
I32
S4
RECORD DESIGN DATA
S5
SAVE PLUG-IN SETTING DATA
B33
S5
SAVE PLUG-IN SETTING DATA
B34
END
B36
S6
COPY HTML TAG
B37
S7
EXECUTE PROCESSING FOR DISPLAYING PORTLET PAGE
EXECUTE PROCESSING FOR DISPLAYING PORTLET PAGE
S7
S8
WHAT IS OPERATION OF USER?
F40 TO F42
S9
RECORD DATA SUCH AS PORTLET NAME
F43
S10
PASTE HTML TAG
B45
B44
TO BE CONTINUED
END
TO BE CONTINUED

FIG.12
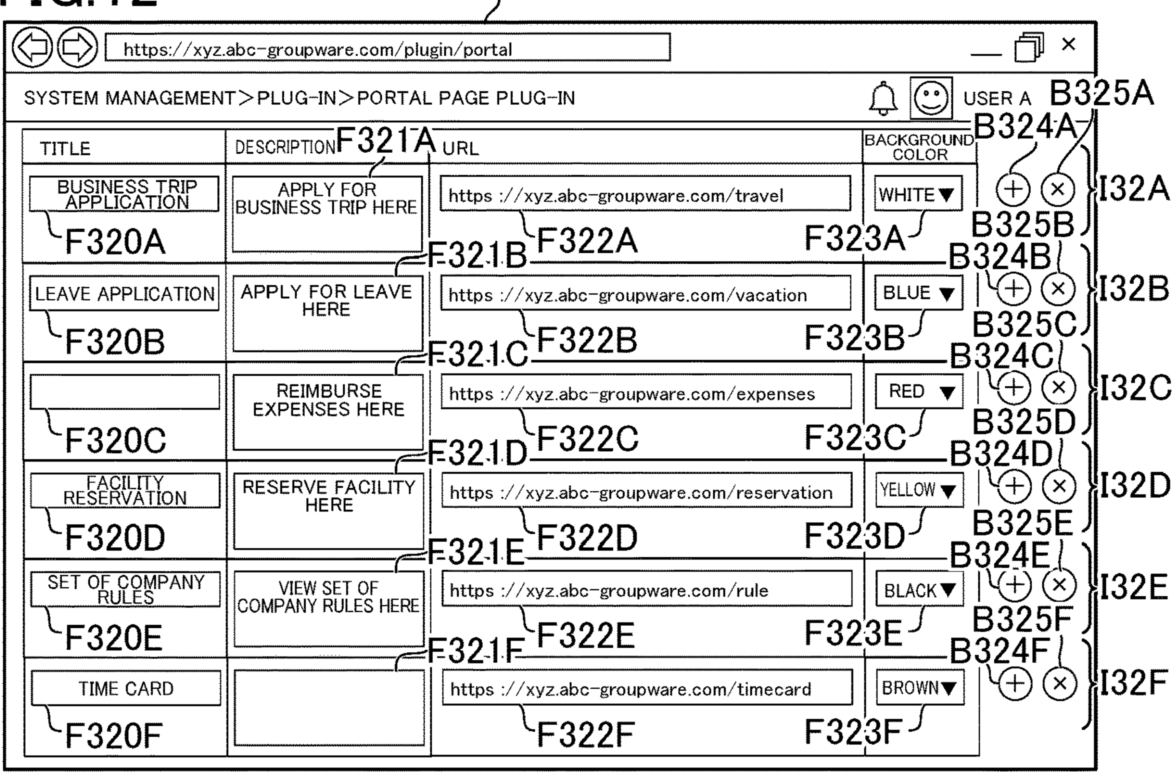
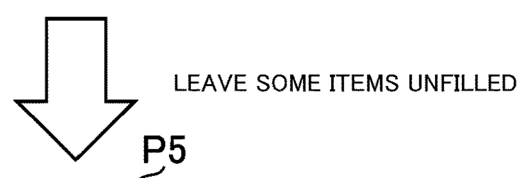
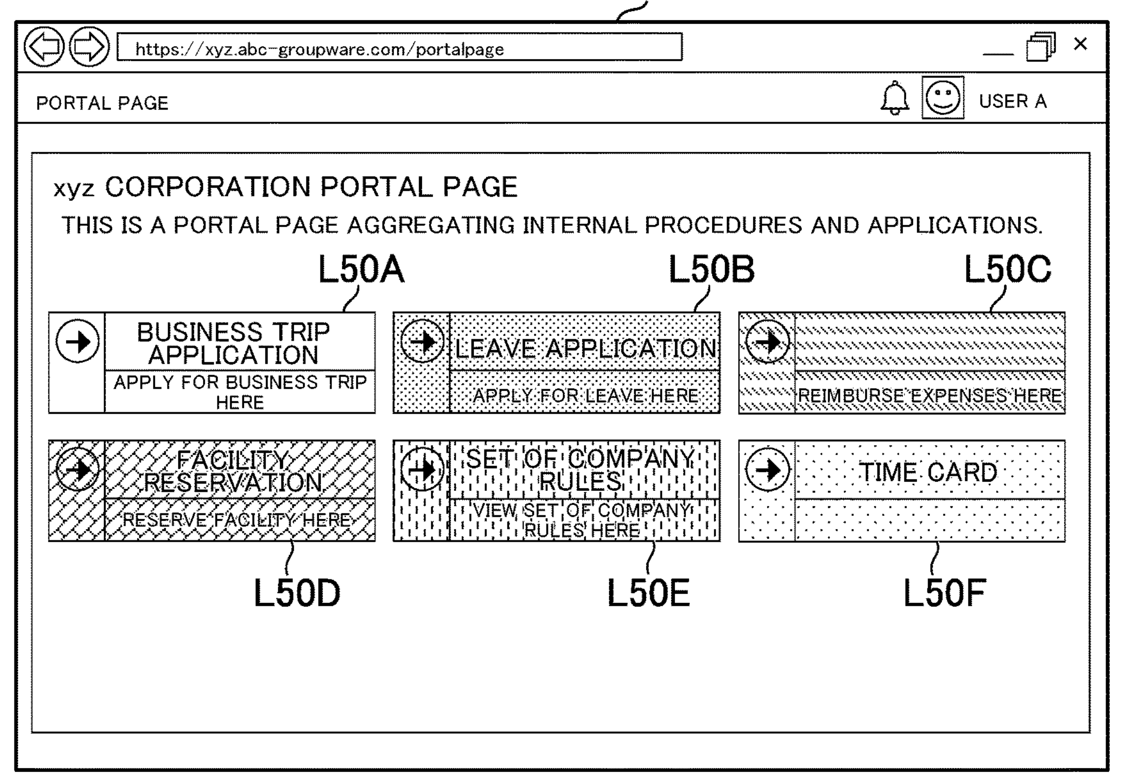

FIG.13
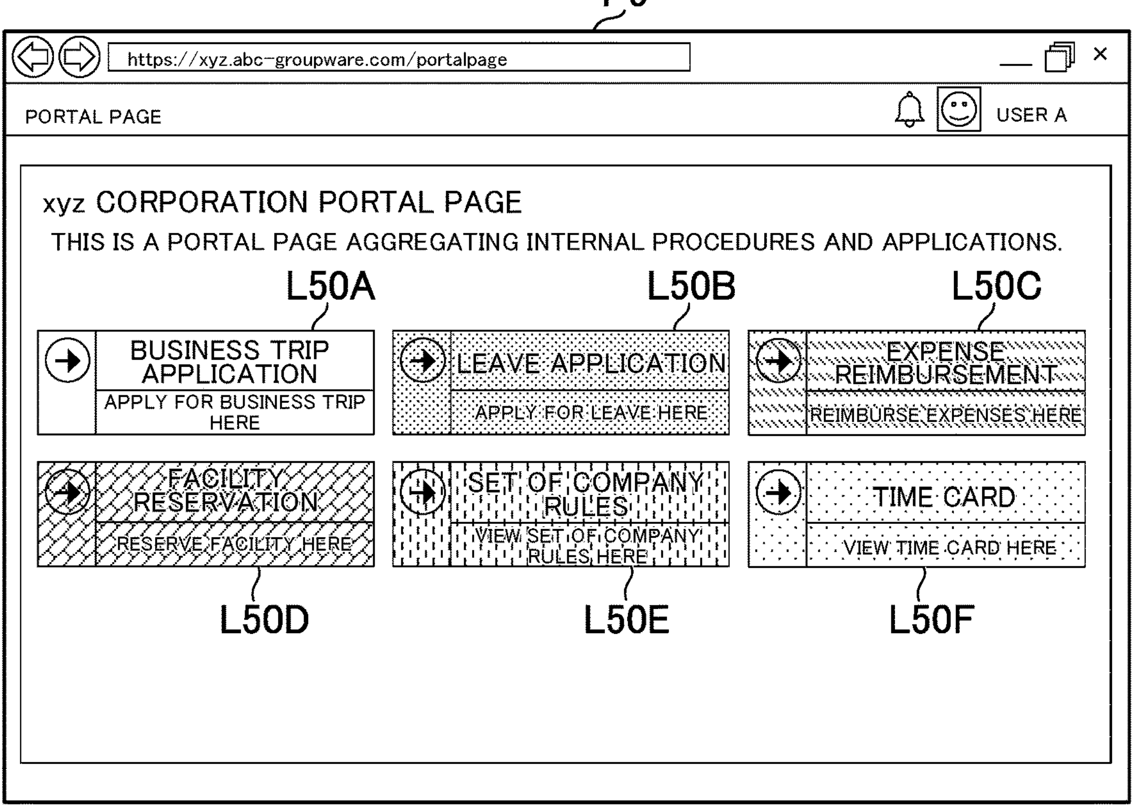
CHANGE SIZE OF WINDOW
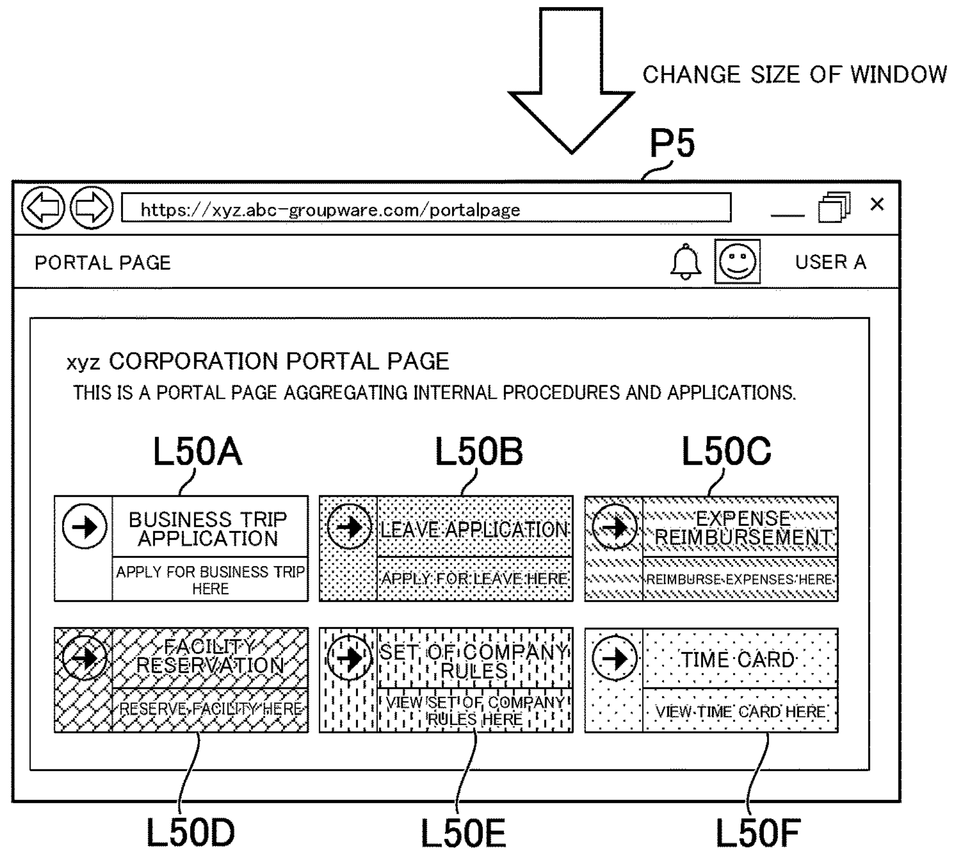

FIG.14

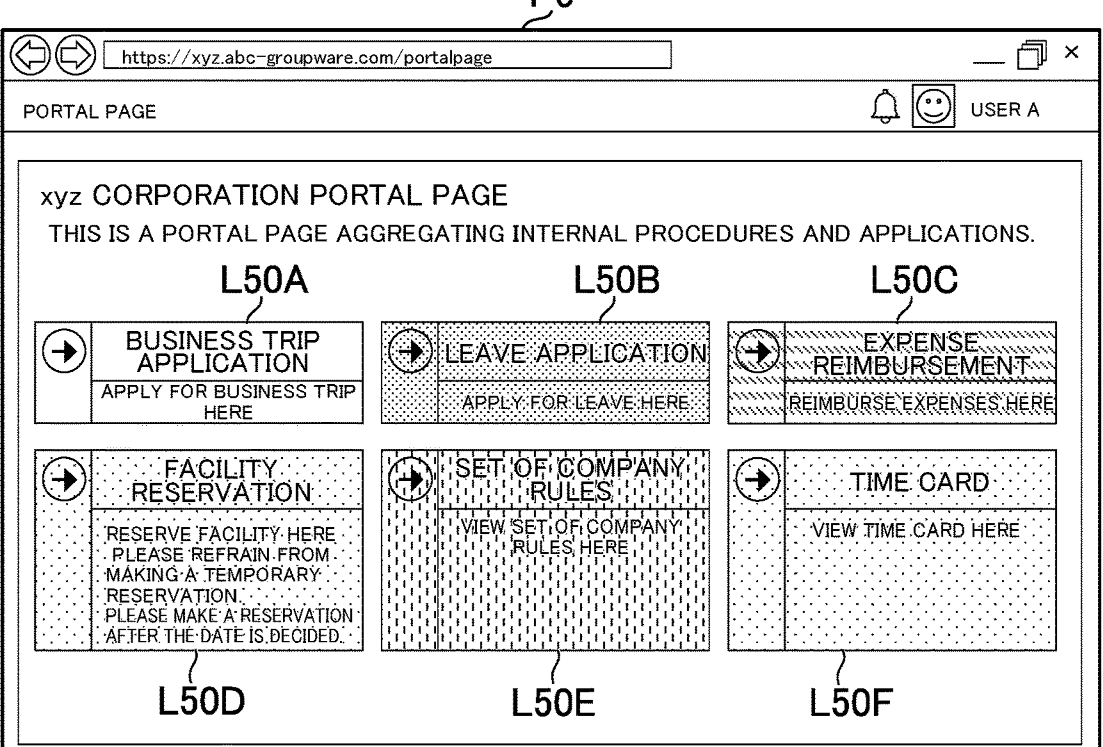
P5
https://xyz.abc-groupware.com/portalpage
PORTAL PAGE
USER A
xyz CORPORATION PORTAL PAGE
THIS IS A PORTAL PAGE AGGREGATING INTERNAL PROCEDURES AND APPLICATIONS.
L50A
L50B
L50C
BUSINESS TRIP APPLICATION
APPLY FOR BUSINESS TRIP HERE
LEAVE APPLICATION
APPLY FOR LEAVE HERE
EXPENSE REIMBURSEMENT
REIMBURSE EXPENSES HERE
FACILITY RESERVATION
RESERVE FACILITY HERE PLEASE REFRAIN FROM MAKING A TEMPORARY RESERVATION. PLEASE MAKE A RESERVATION AFTER THE DATE IS DECIDED.
SET OF COMPANY RULES
VIEW SET OF COMPANY RULES HERE
TIME CARD
VIEW TIME CARD HERE
L50D
L50E
L50F
CASE OF MATCHING VERTICAL WIDTH ON ROW-BY-ROW BASIS
CASE OF MATCHING HORIZONTAL WIDTH ON COLUMN-BY-COLUMN BASIS

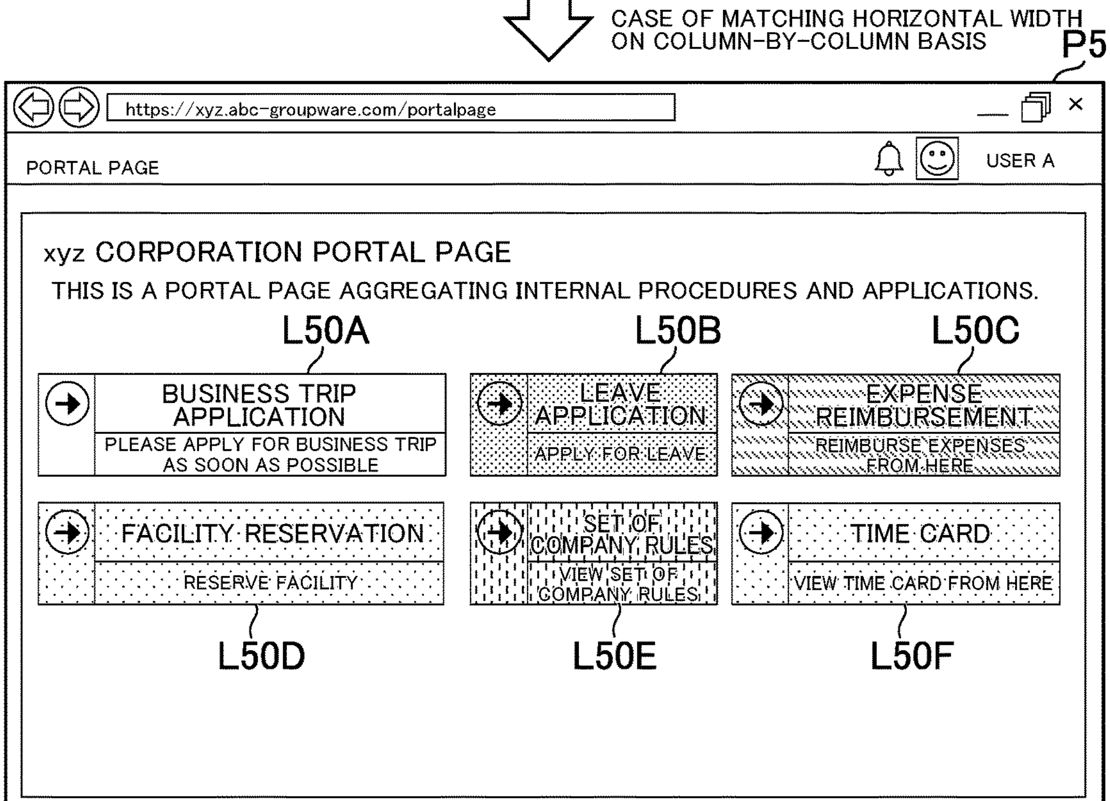
P5
https://xyz.abc-groupware.com/portalpage
PORTAL PAGE
USER A
xyz CORPORATION PORTAL PAGE
THIS IS A PORTAL PAGE AGGREGATING INTERNAL PROCEDURES AND APPLICATIONS.
L50A
L50B
L50C
BUSINESS TRIP APPLICATION
PLEASE APPLY FOR BUSINESS TRIP AS SOON AS POSSIBLE
LEAVE APPLICATION
APPLY FOR LEAVE
EXPENSE REIMBURSEMENT
REIMBURSE EXPENSES FROM HERE
FACILITY RESERVATION
RESERVE FACILITY
SET OF COMPANY RULES
VIEW SET OF COMPANY RULES
TIME CARD
VIEW TIME CARD FROM HERE
L50D
L50E
L50F

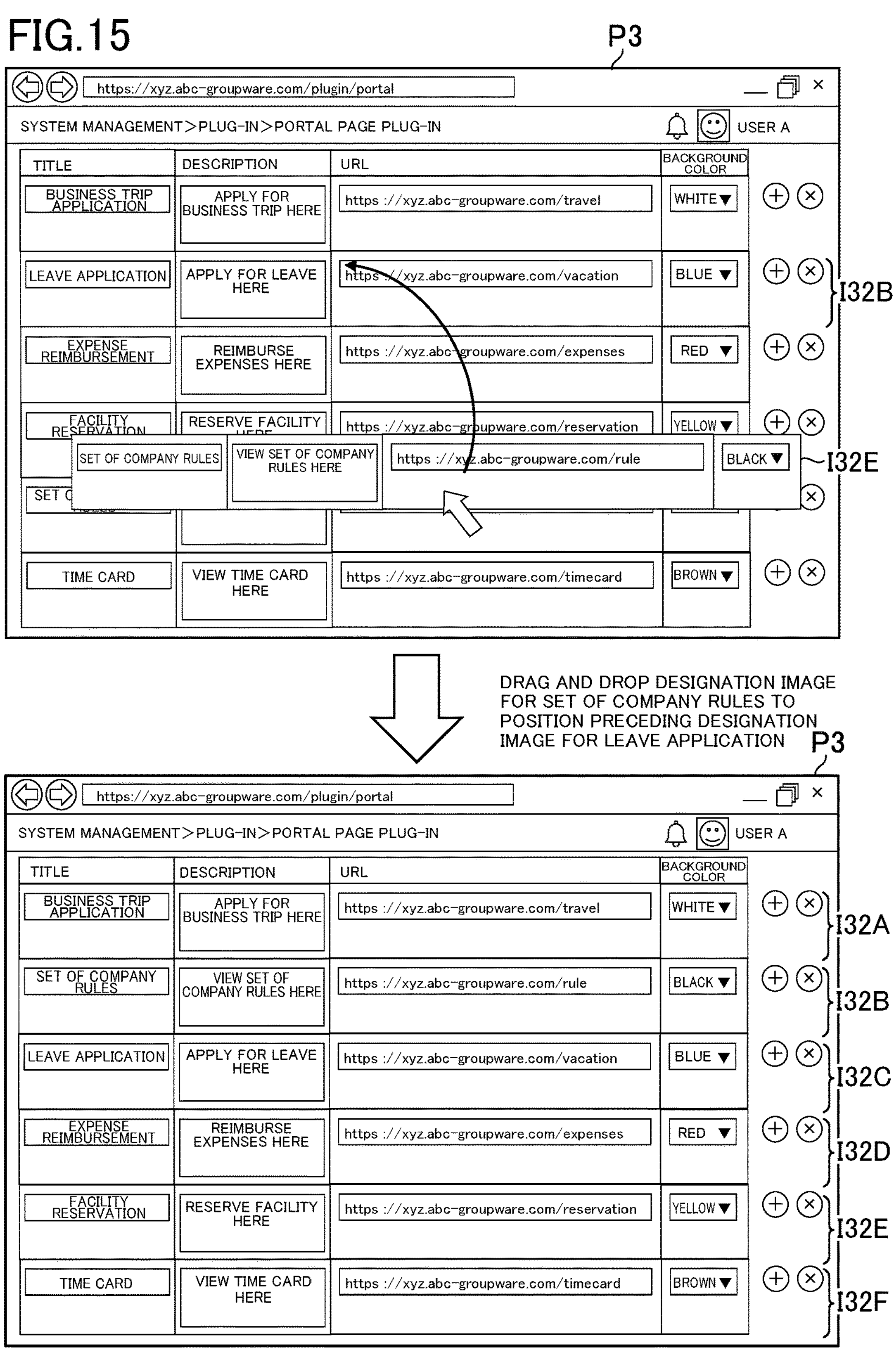
FIG.15
P3
https://xyz.abc-groupware.com/plugin/portal
SYSTEM MANAGEMENT>PLUG-IN>PORTAL PAGE PLUG-IN
USER A
TITLE
DESCRIPTION
URL
BACKGROUND COLOR
BUSINESS TRIP APPLICATION
APPLY FOR BUSINESS TRIP HERE
https ://xyz.abc-groupware.com/travel
WHITE
LEAVE APPLICATION
APPLY FOR LEAVE HERE
https ://xyz.abc-groupware.com/vacation
BLUE
I32B
EXPENSE REIMBURSEMENT
REIMBURSE EXPENSES HERE
https ://xyz.abc-groupware.com/expenses
RED
FACILITY RESERVATION
RESERVE FACILITY HERE
https ://xyz.abc-groupware.com/reservation
YELLOW
SET OF COMPANY RULES
VIEW SET OF COMPANY RULES HERE
https ://xyz.abc-groupware.com/rule
BLACK
I32E
TIME CARD
VIEW TIME CARD HERE
https ://xyz.abc-groupware.com/timecard
BROWN
DRAG AND DROP DESIGNATION IMAGE FOR SET OF COMPANY RULES TO POSITION PRECEDING DESIGNATION IMAGE FOR LEAVE APPLICATION
P3
https://xyz.abc-groupware.com/plugin/portal
SYSTEM MANAGEMENT>PLUG-IN>PORTAL PAGE PLUG-IN
USER A
TITLE
DESCRIPTION
URL
BACKGROUND COLOR
BUSINESS TRIP APPLICATION
APPLY FOR BUSINESS TRIP HERE
https ://xyz.abc-groupware.com/travel
WHITE
I32A
SET OF COMPANY RULES
VIEW SET OF COMPANY RULES HERE
https ://xyz.abc-groupware.com/rule
BLACK
I32B
LEAVE APPLICATION
APPLY FOR LEAVE HERE
https ://xyz.abc-groupware.com/vacation
BLUE
I32C
EXPENSE REIMBURSEMENT
REIMBURSE EXPENSES HERE
https ://xyz.abc-groupware.com/expenses
RED
I32D
FACILITY RESERVATION
RESERVE FACILITY HERE
https ://xyz.abc-groupware.com/reservation
YELLOW
I32E
TIME CARD
VIEW TIME CARD HERE
https ://xyz.abc-groupware.com/timecard
BROWN
I32F FIG. 16
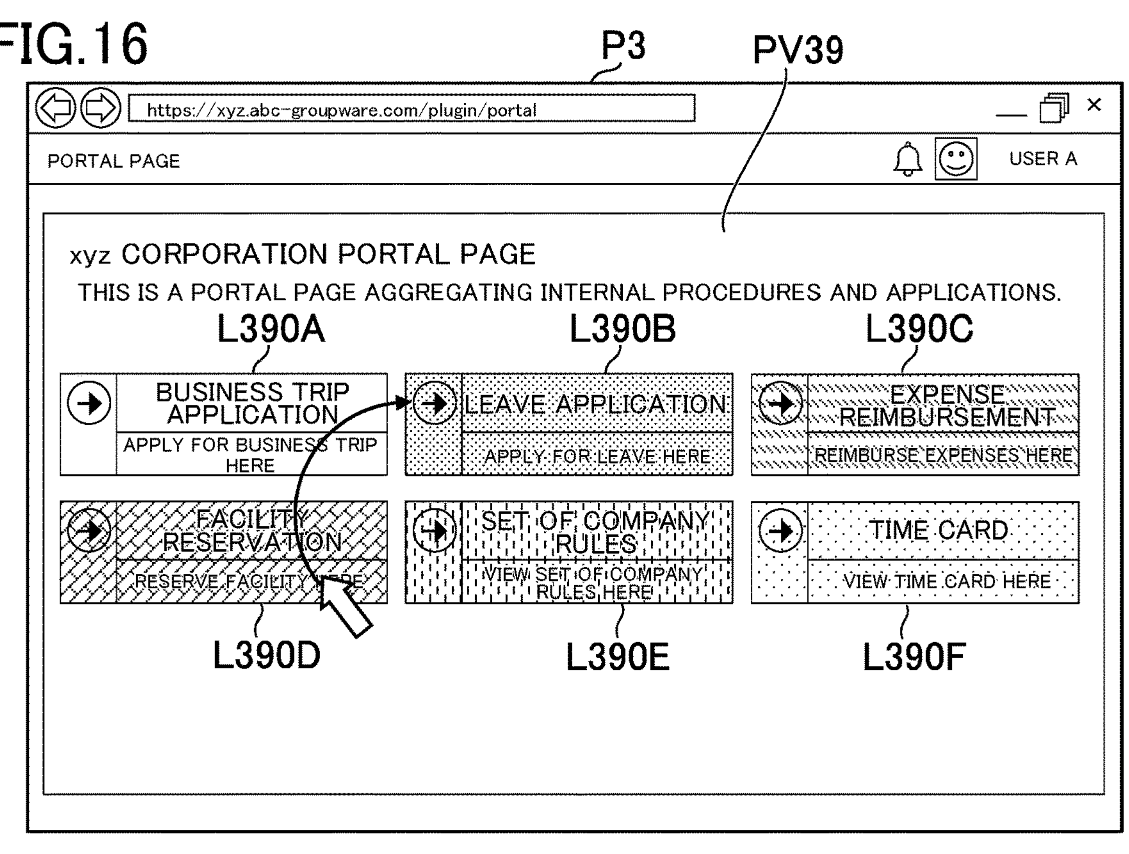
DRAG AND DROP LINK FOR FACILITY RESERVATION TO POSITION PRECEDING LINK FOR LEAVE APPLICATION
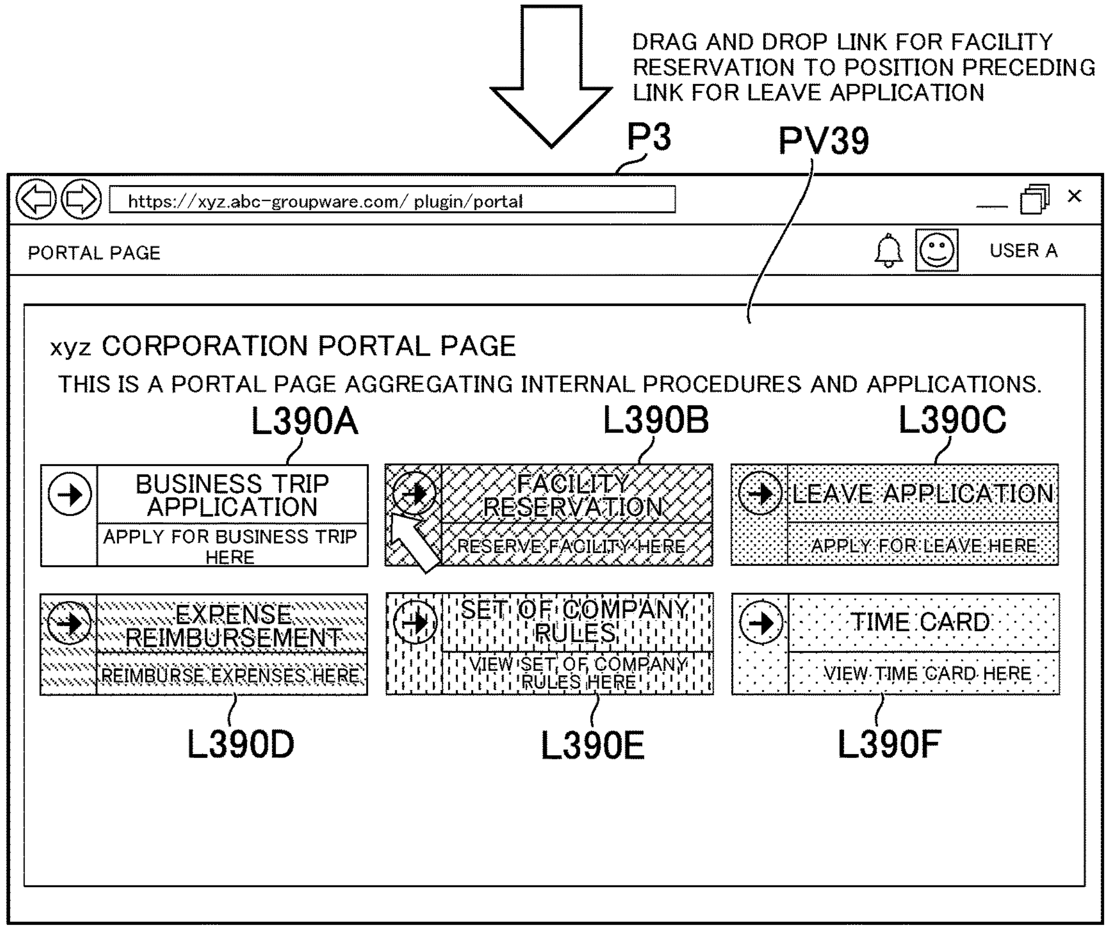

TASK SUPPORT SYSTEM, TASK SUPPORT METHOD, AND INFORMATION STORAGE MEDIUM

CROSS-REFERENCE TO RELATED APPLICATION

The present disclosure contains subject matter related to that disclosed in Japanese Patent Application JP 2023-014816 filed in the Japan Patent Office on Feb. 2, 2023 the entire contents of which are hereby incorporated by reference.

BACKGROUND OF THE INVENTION

1. Field of the Invention

The present disclosure relates to a task support system, a task support method, and an information storage medium.

2. Description of the Related Art

Hitherto, there has been known a task support system for supporting users in tasks. The task support system is sometimes called groupware. In the task support system, a portal page serving as an entrance to various pages is used. When a user attempts to create a portal page by himself or herself, knowledge of code such as HTML or CSS is required, and hence there has been a demand for a technology for supporting creation of a portal page.

For example, on a website ("You can create any content from blogs to highly functional websites," the Internet, retrieved on Dec. 12, 2022, online, https://ja.wordpress.org/), there is described an open source tool that allows a user to create a web page without inputting code. The tool on the above-mentioned website allows the user to create a web page by dragging and dropping template images provided in advance onto a preview screen or directly inputting content to the preview screen, even without requiring the user to input code.

However, the technology on the above-mentioned website is assumed to create a general web page, and is not specialized for the portal page of a task support system. Similarly, tools other than that on the above-mentioned website are merely tools for supporting the creation of a general web page, and are not specialized for the portal page of a task support system. Thus, with the related art, it has been impossible to sufficiently increase convenience of the user who creates the portal page of a task support system.

SUMMARY OF THE INVENTION

One object of the present disclosure is to increase convenience of a user.

According to at least one aspect of the present disclosure, there is provided a task support system including: a display control module that displays a design designation page that allows a user to designate designs of links to task support pages for supporting tasks afterward even without requiring the user to input code of a portal page including the links; an acquisition module that acquires design data indicating the designs designated by the user on the design designation page; and a creation module that creates the portal page based on the design data.

BRIEF DESCRIPTION OF THE DRAWINGS

FIG. 4 is a view for illustrating an example of a design designation page.

FIG. 5 is a view for illustrating an example of a portlet page.

FIG. 7 is a view for illustrating an example of a task support page to be displayed when a link is selected.

FIG. 9 is a table for showing an example of a plug-in database.

FIG. 10 is a flow chart for illustrating an example of processing to be executed by the task support system.

FIG. 12 is a view for illustrating an example of the portal page in a case in which there are items left unfilled.

FIG. 13 is a view for illustrating an example of the portal page in a case in which a size of a window is changed.

FIG. 14 is a view for illustrating an example of a portal page in Modification Example 3.

FIG. 15 is a view for illustrating an example of how an order of designation images is changed.

FIG. 16 is a view for illustrating another example of an order change operation.

DESCRIPTION OF THE EMBODIMENTS

1. Overall Configuration of Task Support System

Figure 1:
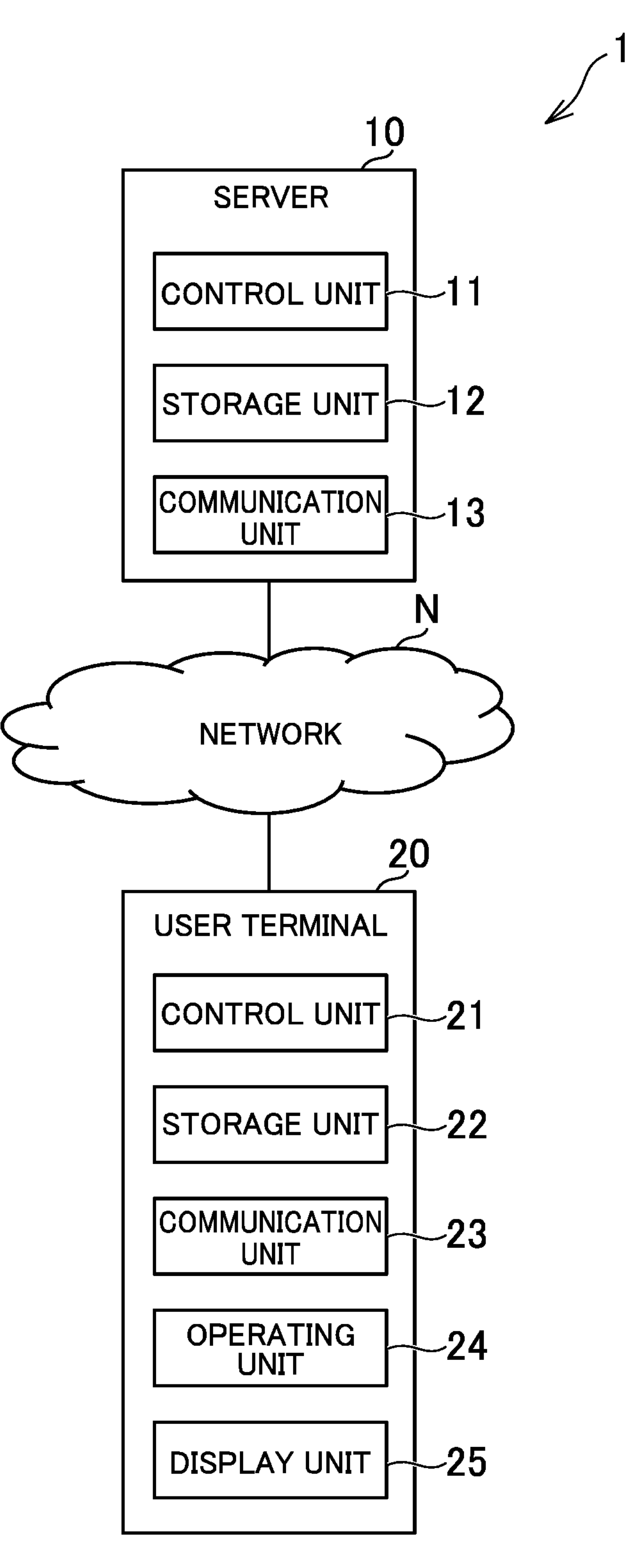
FIG. 1 is a diagram for illustrating an example of an overall configuration of a task support system.

An example of a task support system according to at least one embodiment of the present disclosure is described. FIG. 1 is a diagram for illustrating an example of an overall configuration of the task support system. For example, a task support system 1 includes a server 10 and a user terminal 20. The server 10 and the user terminal 20 are each connected to a network N, such as the Internet or a LAN. In FIG. 1, only one user terminal 20 is illustrated, but there are a plurality of user terminals 20 for a respective plurality of users who use the task support system 1.

The server 10 is a server computer. For example, the server 10 includes a control unit 11, a storage unit 12, and a communication unit 13. The control unit 11 includes at least one processor. The storage unit 12 includes at least one of a volatile memory such as a RAM, or a non-volatile memory such as a flash memory. The communication unit 13 includes at least one of a communication interface for wired communication or a communication interface for wireless communication.

The user terminal 20 is a computer of a user. For example, the user terminal 20 is a personal computer, a tablet computer, or a smartphone. For example, the user terminal 20 includes a control unit 21, a storage unit 22, a communication unit 23, an operating unit 24, and a display unit 25. Hardware configurations of the control unit 21, the storage unit 22, and the communication unit 23 may be the same as those of the control unit 11, the storage unit 12, and the communication unit 13, respectively. The operating unit 24 is an input device, such as a mouse, a touch panel, or a keyboard. The display unit 25 is a display, such as a liquid crystal display or an organic EL display.

Programs stored in the storage units 12 and 22 may be supplied through the network N. Hardware configurations of the server 10 and the user terminal 20 are not limited to the examples of FIG. 1. For example, a reading unit (for example, optical disc drive or memory card slot) for reading a computer-readable information storage medium or an input/output unit (for example, USB terminal) for directly connecting to an external device may be included. In this case, programs stored in the information storage medium may be supplied through intermediation of the reading unit or the input/output unit.

Further, the task support system 1 is only required to include at least one computer. The computers included in the task support system 1 are not limited to the example of FIG. 1. For example, the task support system 1 is not required to include the user terminal 20. In this case, the user terminal 20 is present outside the task support system 1, and the task support system 1 includes only the server 10. The task support system 1 may include the server 10 and another server computer. The task support system 1 may include only another computer different from the server computer.

2. Outline of Task Support System

The task support system 1 supports users in tasks through use of a program developed for supporting users in tasks. Each task itself may have any detail, and may be, for example, a task in a company, a sole proprietorship, an administrative organ, a non-profit corporation, or another organization. For example, when a user operates the operating unit 24 to log in to the task support system 1, a top page of the task support system 1 is displayed on the display unit 25.

Figure 2:
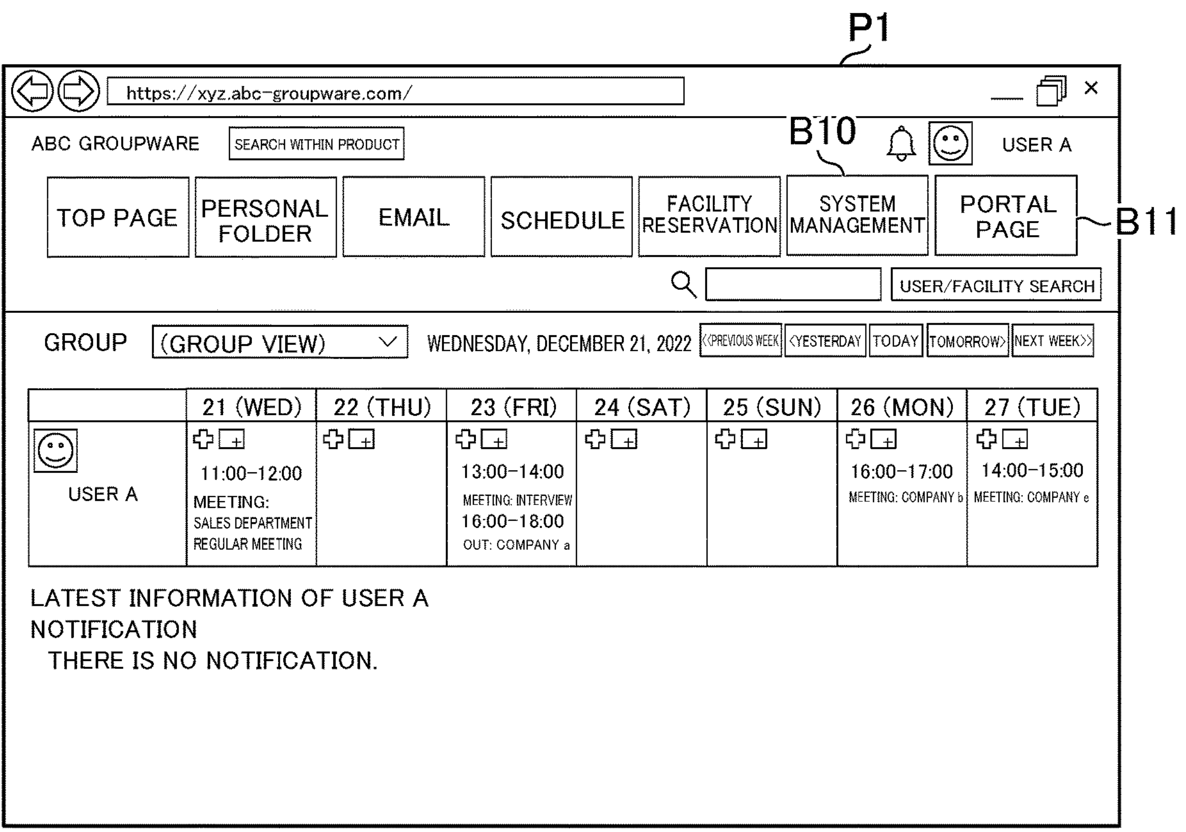
FIG. 2 is a view for illustrating an example of a top page.

FIG. 2 is a view for illustrating an example of the top page. In the at least one embodiment, the task support system 1 of a cloud type is taken as an example, but the task support system 1 may be of an on-premises type. Further, a case in which each page is displayed by a browser is described, but each page may be displayed by an application dedicated to the task support system 1. The page can also be said to be a user interface that receives some operation of the user. For example, the user can access various task support pages provided by the task support system 1 from a top page P1.

The task support page is a page for the task support system 1 to support the user in tasks. For example, the task support page is a user interface that receives some operation for tasks of the user. The task support page may be a page that only displays some information on tasks of the user instead of receiving the operation of the user. The task support page may be a publicly known page, examples of which include a page for the user to perform each of various applications such as a business trip application and a leave application, a page for the user to make an expense reimbursement, a page for the user to view a set of company rules, and a page for the user to stamp a time card.

In the at least one embodiment, of functions provided by the task support system 1, a function for the task support system 1 to create a portal page is mainly described. The portal page is a page including a link (described later) to each task support page. The portal page serves as an entrance to a task support page for a specific organization. The top page P1 also serves as the entrance in a sense that the user terminal 20 can access some task support page. However, while the top page P1 can be customized by each individual user, the portal page is a page common to users belonging to the same organization. For example, the task support system 1 creates a portal page for each organization. In the at least one embodiment, it is assumed that only a user who has an administrative authority can customize the portal page. When a plug-in (described later) is used, the portal page corresponds to a top page of the plug-in.

The link is information for the user terminal 20 to access the task support page. The link appears in the portal page. In the at least one embodiment, a browser is used, and hence a URL is associated with the link. It suffices that information indicating the task support page is associated with the link, and only a part (for example, only a part other than a domain or an argument in the other part) of the URL may be associated with the link. For example, when an application dedicated to the task support system 1 is used instead of the browser, an ID or other information that can identify each individual task support page instead of the URL may be associated with the link. For example, the link includes a title, a description, or an icon of the task support page or a combination thereof. The link may have any format, for example, may have an image format such as JPEG, PNG, GIF, or BMP, may have a format of a character string (text) representing the title of the task support page, or may be a component such as a frame line included in the portal page.

In the at least one embodiment, when the user performs a predetermined addition operation (described later), the server 10 adds a plug-in for a portal page to the storage unit 12. The plug-in is one of extensions of the task support system 1. The plug-in is sometimes called by another name such as an app. The plug-in may include not only a program for extending the function but also basic data (for example, HTML data having a page format) of a page to be displayed on the user terminal 20. For example, when the user selects a button B10 on the top page P1, a plug-in page for adding a plug-in is displayed on the display unit 25.

Figure 3:
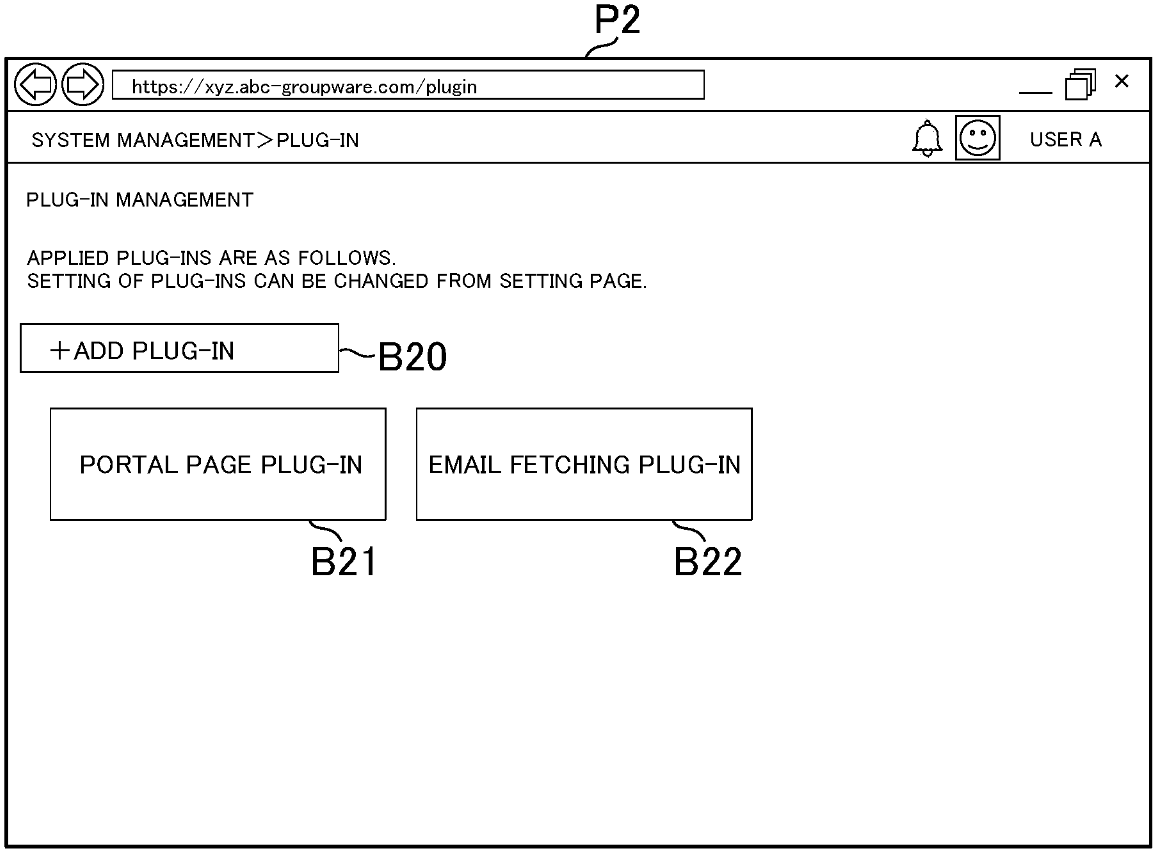
FIG. 3 is a view for illustrating an example of a plug-in page.

FIG. 3 is a view for illustrating an example of the plug-in page. For example, a list of plug-ins that have been added by the server 10 is displayed on a plug-in page P2. In the example of FIG. 3, the server 10 has already added a portal page plug-in that is a plug-in for a portal page. When the user selects a button B20, the server 10 adds a new plug-in. An operation for the user to select the button B20 is an example of an addition operation described later. In a case in which the server 10 has not yet added the portal page plug-in to the storage unit 12, when the user selects the button B20, the server 10 adds the portal page plug-in to the storage unit 12.

For example, the user can perform an operation for causing the server 10 to change plug-in setting data indicating setting of an already added plug-in from the plug-in page P2. When the user selects a button B21 for the portal page plug-in, the user terminal 20 displays a design designation page that allows the user to mainly designate a design (described later) of each link. Data for causing the user terminal 20 to display the design designation page is also included in the portal page plug-in. Thus, in the at least one embodiment, the design designation page is not displayed unless the server 10 has added the portal page plug-in. When the user selects a button B22 for another plug-in, the user can change the plug-in setting data indicating the setting of the other plug-in.

FIG. 4 is a view for illustrating an example of the design designation page. For example, a design designation page P3 includes an input form F30 for the user to input the title of a portal page, an input form F31 for the user to input the description of the portal page, and a designation image I32A for the user to designate the design of a link. Data indicating the design designated by the user is hereinafter referred to as "design data." In the at least one embodiment, a case in which the design data has four items, namely, the title of a link, the description of the link, a URL to be associated with the link, and a background color of the link, is described. The design data is one of pieces of plug-in setting data indicating the setting of the plug-in.

In the example of FIG. 4, the designation image I32A includes an input form F320A for the user to input the title of a link, an input form F321A for the user to input the description of the link, an input form F322A for the user to input the URL associated with the link, an input form F323A for the user to input the background color of the link, and buttons B324A and B325A described later. A group of those images corresponds to the designation image I32A. The designation image I32A is an image for the user to designate the design of a link. A focus on each of components included in the design designation page P3 may be sequentially shifted by a tab key of the keyboard of the operating unit 24.

For example, the user can input any character string to each of the input forms F30, F31, F320A, F321A, and F322A. The user can also leave each input form blank without particularly inputting a character string. The user can select any background color from among candidates for the background color to be displayed in a pull-down menu of the input form F323A. When the user selects the button B324A, the user terminal 20 adds a new designation image I32B below the button B324A. When the user selects the button B325A, the user terminal 20 deletes the designation image I32A.

An example of the design designation page P3 in a case in which the user designates designs of six links is shown in the lower half of FIG. 4. The design designation page P3 in the lower half of FIG. 4 includes six designation images I32A to I32F corresponding to the six links. The six designation images I32A to I32F are arranged from the top to the bottom on the design designation page P3. An order of the designation images I32A to I32F corresponds to an order of the links on the portal page.

The designation images I32A to I32F are hereinafter referred to as "designation images I32" unless distinguished from one another. Similarly, the input forms F320A to F320F, the input forms F321A to F321F, the input forms F322A to F322F, and the input forms F323A to F323F are hereinafter referred to as "input forms F320," "input forms F321," "input forms F322," and "input forms F323," respectively, unless distinguished from one another. The buttons B324A to B324F and the buttons B325A to B325F are hereinafter referred to as "buttons B324" and "buttons B325," respectively, unless distinguished from one another.

For example, when the user selects a button B33, the server 10 saves the plug-in setting data. When the user selects a button B34, the server 10 cancels the saving of the plug-in setting data. In the at least one embodiment, it is assumed that the plug-in setting data is not reflected in the portal page only by being saved by the server 10. For example, the user performs an operation for adding an HTML tag (described later) to an HTML portlet (described later) in order to reflect the plug-in setting data in the portal page. When the HTML tag is added, the plug-in setting data is reflected in the portal page.

The HTML portlet is a portlet created by describing an HTML tag. The portlet is a type of program for adding a function or information to a web page. The HTML tag is code in HTML. The HTML tag is defined by specific symbols such as "<" and ">". A mechanism for the HTML portlet may be a publicly known mechanism. Other plug-ins besides the portal page plug-in can also call the HTML portlet.

For example, the design designation page P3 includes a display area A35 that shows an HTML tag to be added to the HTML portlet. The HTML tag is information that can identify the plug-in setting data being set on the design designation page P3. The HTML tag can be designated by the user, but in the at least one embodiment, it is assumed that the HTML tag is automatically generated based on an organization of the user, a name of the plug-in, and the like. When the user selects a button B36, the user terminal 20 copies the HTML tag displayed in the display area A35. For example, when the user selects a button B37, the user terminal 20 displays a portlet page for editing the HTML portlet of the portal page plug-in.

Figure 5:
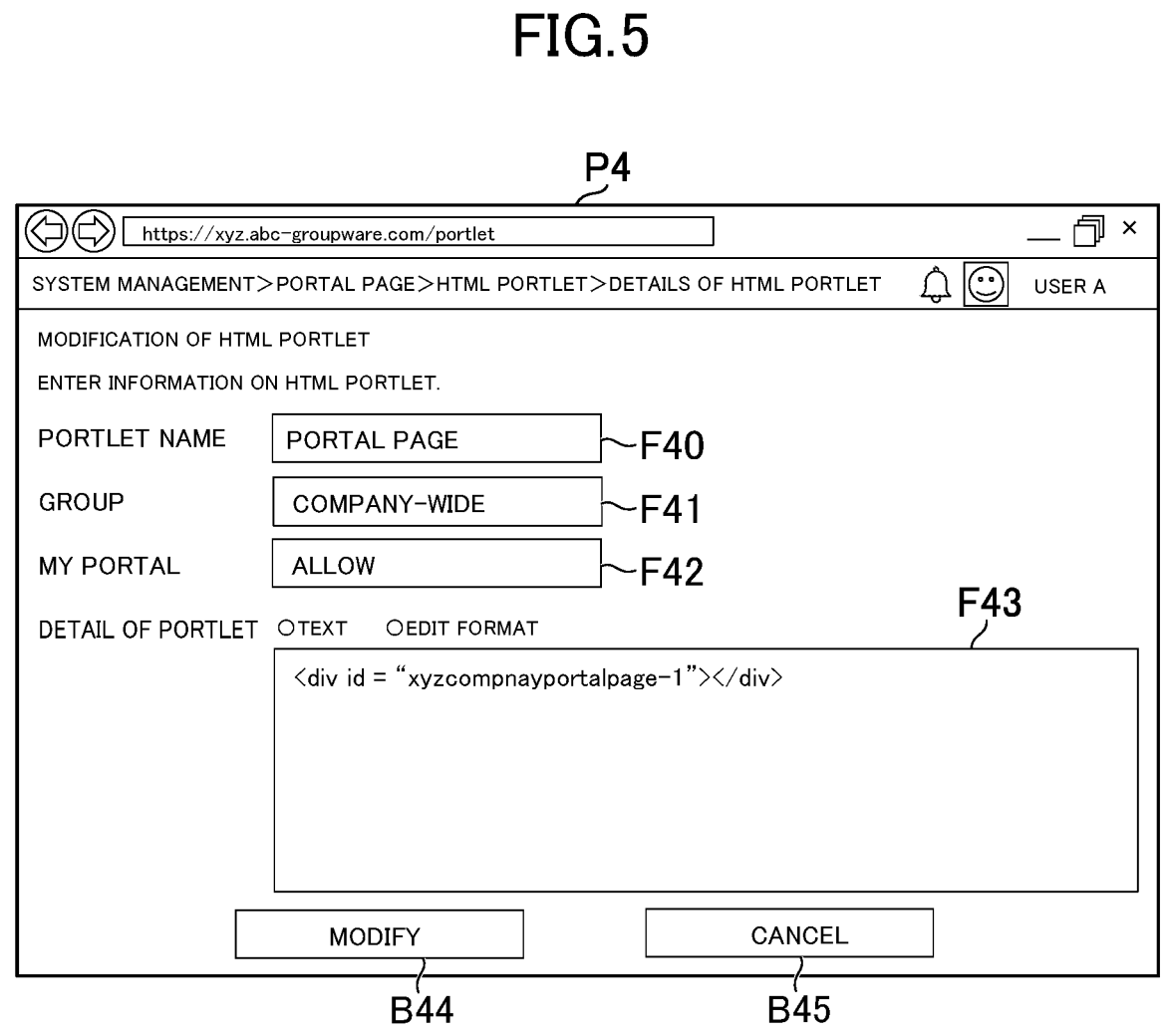

FIG. 5 is a view for illustrating an example of the portlet page. For example, a portlet page P4 includes an input form F40 for the user to input a name of a portlet, an input form F41 for the user to input a group to which the portlet belongs, an input form F42 for the user to input whether or not to allow the portlet to be registered in My Portal, which is a portal page dedicated to each individual user, and an input form F43 for the user to input a detail of the HTML portlet. The user can input any character string to the input forms F40 to F43.

For example, the user performs an operation for pasting the HTML tag copied on the design designation page P3 to the input form F43. The input form F43 corresponds to an editor for the user to input HTML code. The code in the at least one embodiment may be of any type, and is not limited to HTML. For example, the code may be XML or CSS code. The code is not limited to a markup language, and may be code in a script language or another program language. The code is not limited to instructions for executing some processing. For example, the code may be a description for referring to some information or a description for defining some variable. The HTML tag is also a type of code. The code also includes tags other than the HTML tag.

When the user selects a button B44, modification of the HTML portlet is completed. When the user selects a button B11 of the top page P1 after modifying the HTML portlet, the portal page corresponding to the modified HTML portlet is displayed on the display unit 25. When the user selects a button B45 of the portlet page P4, the modification of the HTML portlet is canceled.

Figure 6:
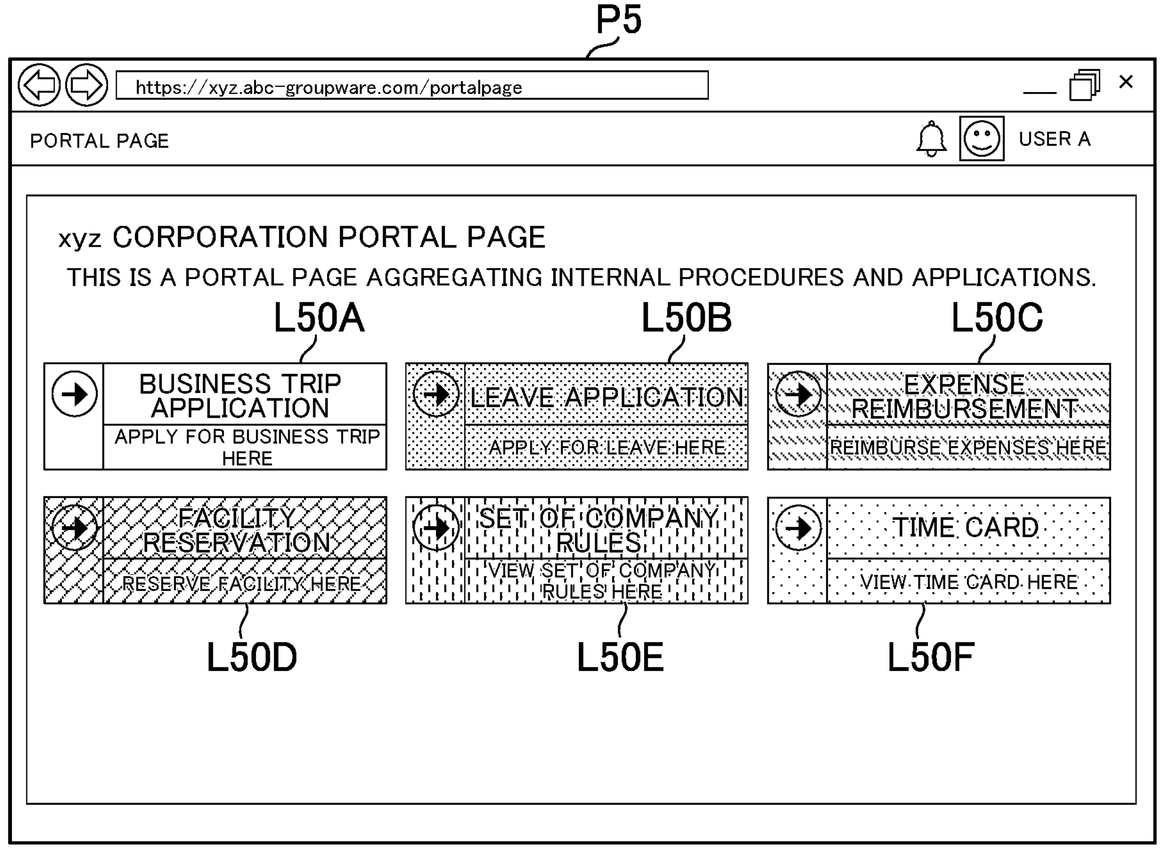
FIG. 6 is a view for illustrating an example of a portal page.

FIG. 6 is a view for illustrating an example of the portal page. For example, on a portal page P5, the title (in the example of FIG. 6, "xyz Corporation Portal Page") and the description (in the example of FIG. 6, "This is a portal page aggregating internal procedures and applications.") that have been input to the input forms F30 and F31 of the design designation page P3 are displayed. Below the title and the description, links L50A to L50F are arranged so as to have a matrix of two rows by three columns. The links L50A to L50F are hereinafter referred to as "links L50" unless distinguished from one another. In the example of FIG. 6, the links L50 have the same size, but may have mutually different sizes.

In the at least one embodiment, an order from the top of the designation images I32 on the design designation page P3 matches an order from the upper left of the links L50 on the portal page P5. For example, the link L50A in the first row and the first column shows details of the first designation image I32A from the top on the design designation page P3. The link L50B in the first row and the second column shows details of the second designation image I32B from the top on the design designation page P3. The link L50C in the first row and the third column shows details of the third designation image I32C from the top on the design designation page P3.

For example, the fourth and subsequent links L50D to L50F are arranged in the second row. The link L50D in the second row and the first column shows details of the fourth designation image I32D from the top on the design designation page P3. The link L50E in the second row and the second column shows details of the fifth designation image I32E from the top on the design designation page P3. The link L50F in the second row and the third column shows details of the sixth designation image I32F from the top on the design designation page P3. In a case of displaying seven or more links L50, it suffices that the links L50 are arranged in the same manner in the third and subsequent rows.

Figure 7:
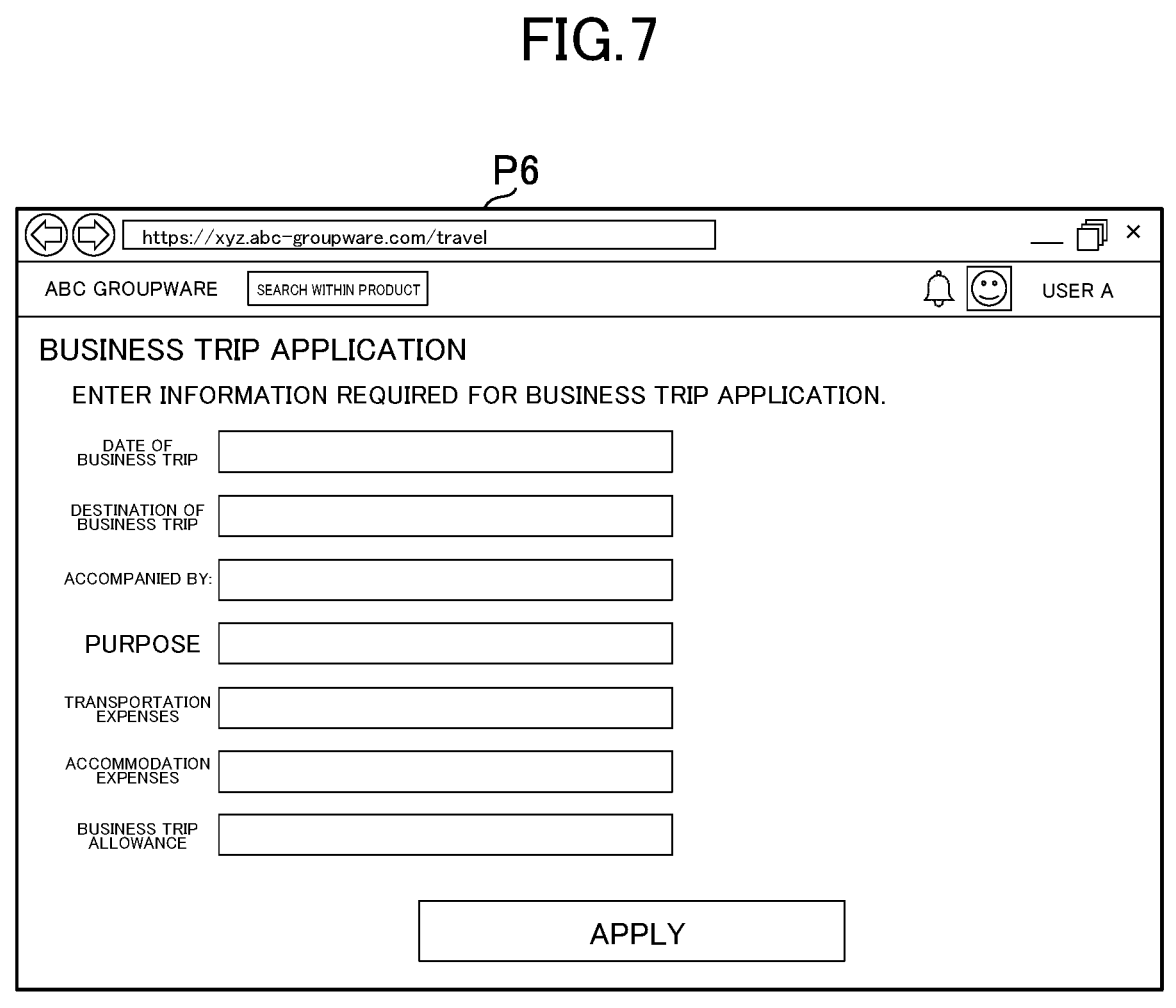

FIG. 7 is a view for illustrating an example of the task support page to be displayed when the link L50 is selected. In the example of FIG. 7, the user has selected the link L50A, and a task support page P6 for a business trip application is displayed on the display unit 25. For example, when the user selects any one of the links L50 on the portal page P5, the task support page P6 indicated by the link associated with the selected link L50 is displayed on the display unit 25. When the user selects each of the other links L50B to L50F, the task support page P6 for each of a leave application, an expense reimbursement, a facility reservation, a set of company rules, and a time card is displayed on the display unit 25 in the same manner.

As described above, for example, the user edits the design of the links L50 from the design designation page P3 after the portal page P5 in an initial state of being unedited by the user is displayed. When the user performs an operation for displaying the portal page P5 after completion of the editing, the portal page P5 in which the edited details have been reflected is displayed. In the at least one embodiment, when the user performs the operation for pasting the HTML tag to the HTML portlet, the edited details are reflected in the portal page P5 even without requiring the user to input code for the portal page P5. Thus, even when the user has no knowledge of code such as HTML or CSS, the user can customize the portal page P5, thereby being able to increase convenience of the user. Details of the task support system 1 are described below.

3. Functions Implemented by Task Support System

Figure 8:
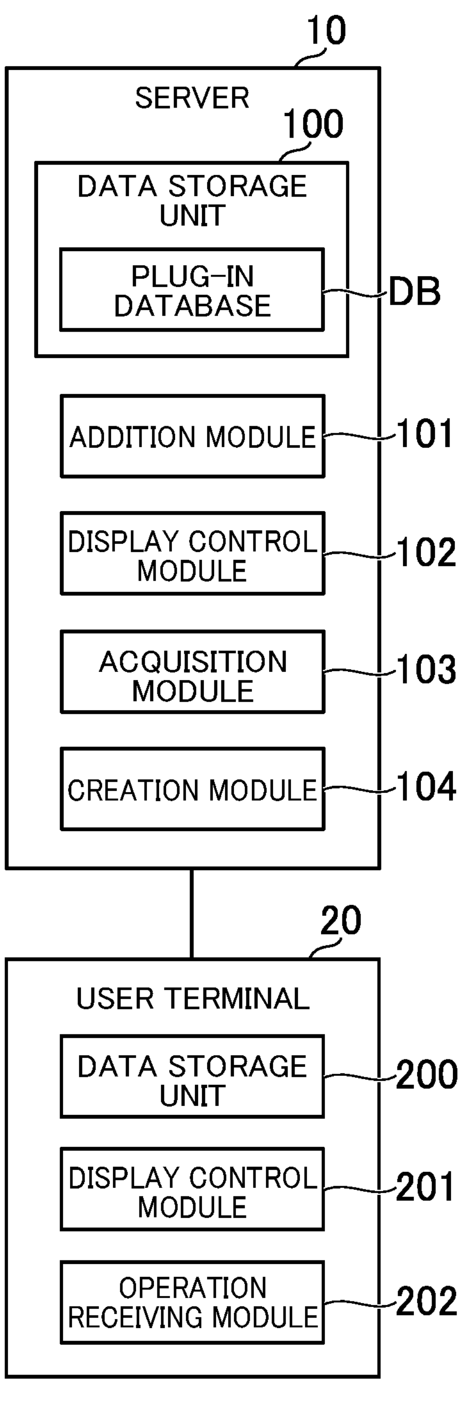
FIG. 8 is a diagram for illustrating an example of functions implemented by the task support system.

FIG. 8 is a diagram for illustrating an example of functions implemented by the task support system 1.

3-1. Functions Implemented by Server

For example, the server 10 includes a data storage unit 100, an addition module 101, a display control module 102, an acquisition module 103, and a creation module 104. The data storage unit 100 is implemented by the storage unit 12. The addition module 101, the display control module 102, the acquisition module 103, and the creation module 104 are implemented by the control unit 11.

[Data Storage Unit]

The data storage unit 100 stores data required for supporting users in tasks. For example, the data storage unit 100 stores a plug-in database DB.

FIG. 9 is a table for showing an example of the plug-in database DB. For example, the plug-in database DB is a database in which plug-ins added by users are stored. For example, the plug-in database DB stores organization data indicating a name of an organization, plug-ins added by users belonging to the organization, HTML portlets corresponding to the plug-ins, HTML tags, and plug-in setting data indicating plug-in setting. In the at least one embodiment, the portal page plug-in is mainly described, but it is assumed that other plug-ins different from the portal page plug-in are also stored in the plug-in database DB.

Any kinds of data may be stored in the plug-in database DB. The data stored in the plug-in database DB is not limited to the example of FIG. 9. For example, the plug-in database DB may store data to be referred to by a plug-in, data of a page such as the design designation page P3 that can be displayed through the addition of a plug-in by the addition module 101 described later, data indicating an access right to a plug-in, or data indicating whether or not a plug-in is disclosed.

The name of the organization is an example of organization identification information that can identify an organization using the task support system 1. The organization identification information is only required to be able to identify the organization in some way, and is not limited to the name of the organization. For example, the organization identification information may be an ID associated with the organization, a representative email address of the organization, or a telephone number of the organization. The organization data may be data indicating any one of those pieces of organization identification information. For a user who uses the task support system 1 as an individual, data indicating a name of the individual instead of the organization may be stored in the plug-in database DB.

Plug-in name data indicating the name of the plug-in may be stored in the plug-in database DB. The name of the plug-in is an example of plug-in identification information that can identify the plug-in. The plug-in identification information is only required to be able to identify the plug-in in some way, and is not limited to the name of the plug-in. For example, the plug-in identification information may be an HTML tag or an ID issued for each plug-in. The HTML portlet is stored for each piece of plug-in identification information. For example, the HTML portlet includes HTML data of a page to be displayed by the plug-in, a program for displaying the page, data required for other processing different from display processing, and a program for executing the other processing.

The HTML tag is an example of setting identification information that can identify the plug-in setting data. In the case of the portal page plug-in, the HTML tag illustrated in FIG. 4 and FIG. 5 is stored in the plug-in database DB. Similar HTML tags may be stored in the plug-in database DB for other plug-ins. The setting identification information is only required to be able to identify the plug-in setting data in some way, and is not limited to the HTML tag. For example, the setting identification information may be a name or an ID issued for each piece of plug-in setting data. The user may be allowed to designate the setting identification information.

In the at least one embodiment, the plug-in setting data includes global setting data indicating the entire portal page P5 and the design data indicating the design of each individual link L50. In the example of FIG. 4, the global setting data indicates the title and the description of the entire portal page P5. The global setting data is only required to indicate some setting of the portal page P5, and is not limited to the example of FIG. 4. For example, the global setting data may indicate an access right to the portal page P5, display or non-display of the portal page P5, setting of a background of the entire portal page P5, or setting of other components different from the links L50.

In the example of FIG. 4, the design data indicates the title, the description, the URL, and the background color of the link L50. The design data is only required to indicate some design of the link L50, and is not limited to the example of FIG. 4. For example, the design data may indicate image data to be used as the link L50, a size of the link L50, a shape of the link L50, an effect of the link L50, a font of characters in the link L50, a color of the characters in the link L50, a size of the characters in the link L50, or an icon to be included in the link L50. The design data may indicate an order of the links L50 (order of the designation images I32 on the design designation page P3).

The data stored in the data storage unit 100 is not limited to the above-mentioned examples. The data storage unit 100 can store any data. For example, the data storage unit 100 may store data required for the user to log in to the task support system 1, HTML data of each page such as the top page P1, a list of plug-ins, and a format of an HTML portlet provided on the task support system 1 side.

[Addition Module]

The addition module 101 adds the portal page plug-in to the data storage unit 100 when the user performs a predetermined addition operation. In the at least one embodiment, a case in which an operation for selecting the button B20 by the user corresponds to an addition operation is described, but the addition operation is only required to be an operation determined in advance, and may be another operation. For example, an operation for selecting a predetermined key on the keyboard by the user, a drag-and-drop operation, or a flick operation may correspond to the addition operation. In the example of FIG. 3, when the user selects the portal page plug-in after selecting the button B20, the addition module 101 stores the portal page plug-in in the plug-in database DB.

[Display Control Module]

The display control module 102 displays, on the display unit 25, various pages for the task support system 1 to support the task. The display control module 102 transmits, to the user terminal 20, display data of a page to be displayed, to thereby display the page on the display unit 25. In the at least one embodiment, a browser is used, and hence HTML data is described as an example of the display data. The display data may have any format, for example, may be XML data, image data in JPG or the like, or data having another format. When an application dedicated to the task support service is used instead of the browser, data for displaying some page in the application may correspond to the display data.

In the at least one embodiment, the display control module 102 displays the design designation page P3 that allows the user to designate the design of each link L50 afterward even without requiring the user to input code of the portal page P5 including the link L50 to each task support page. The user inputting code refers to the user inputting characters, numbers, or both thereof that form the code. When other symbols different from characters and numbers can form the code, the user inputting the other symbols corresponds to the user inputting the code. The user inputs the code by inputting characters, numbers, or other symbols from the keyboard or a software keyboard. As in the at least one embodiment, the operation for pasting the HTML tag does not involve inputting characters, numbers, or other symbols by the user, and thus does not correspond to the user inputting the code.

Further, the display control module 102 displays the design designation page P3 based on the portal page plug-in. The portal page plug-in includes a program for causing the display control module 102 to display the design designation page P3. The display control module 102 displays the design designation page P3 based on the program. The design designation page P3 may inhibit the user from inputting any code, or may allow the user to input code. For example, the design designation page P3 may include an input form similar to the input form F43 of the portlet page P4 so as to allow the user to input code from the input form. It suffices that the design designation page P3 does not require the user to input code to input the design data. The user may be allowed to designate the design by inputting code.

The design of each link L50 refers to an appearance of the link L50. The design of each link L50 can also be said to be details of the link L50 instead of an arrangement of the links L50 on the portal page P5. The design of each link L50 affects not the character string itself included in the link L50 but an aesthetic appearance of the link L50. For example, a font of a character string, a color of the character string, a size of the character string, or a combination thereof corresponds to the design of each link L50. For example, an icon or another image included in the link L50 also corresponds to the design of each link L50. For example, when the whole links L50 are set as one image, the one image also corresponds to the design of each link L50. The color, the shape, the size, or the effect of the link L50 or a combination thereof also corresponds to the design of each link L50.

In the at least one embodiment, the display control module 102 displays the design designation page P3 including a plurality of items. For example, design data indicating four items to be input to the input forms F320 to F323 by the user corresponds to design data on the link L50. The design data on the link L50 may be only one item instead of the plurality of items. In the example of FIG. 4, there is also global setting data indicating setting other than the design of the link L50, such as the title and the description of the portal page P5 itself, but in the at least one embodiment, the design data is mainly described.

On the portal page P5 in the at least one embodiment, the links L50 are arranged in a plurality of rows and a plurality of columns. The row is a group of images having the same position in a vertical direction. The column is a group of images having the same position in a horizontal direction. The number of rows and the number of columns are not limited to two rows by three columns as in FIG. 6, and may be any number of rows and any number of columns. For example, the number of rows may be one or three or more. The number of columns may be one, two, or four or more. The user may be allowed to input the number of rows and the number of columns as items included in the design data.

For example, the display control module 102 displays the design designation page P3 on which the designation images I32 for the user to designate the designs are arranged. In the example of FIG. 4, the display control module 102 displays the design designation page P3 on which a plurality of designation images I32 are arranged from the top to the bottom. The display control module 102 may display the design designation page P3 on which the plurality of designation images I32 are arranged in another direction such as from the bottom to the top, from the left to the right, or from the right to the left. The number of links L50 and the number of designation images I32 are assumed to be the same, but those numbers may differ from each other.

[Acquisition Module]

The acquisition module 103 acquires the design data indicating the designs designated by the user on the design designation page P3. In the at least one embodiment, the acquisition module 103 is implemented by the server 10, and thus acquires the design data input through the design designation page P3 from the user terminal 20. In the example of FIG. 4, the acquisition module 103 acquires the details input to the respective input forms F30 to F323, to thereby acquire the design data. In the at least one embodiment, there is also global setting data, and hence the acquisition module 103 acquires plug-in setting data including global setting data and the design data.

For example, the acquisition module 103 acquires the design data based on the portal page plug-in. The portal page plug-in includes a program for the acquisition module 103 to acquire the design data. The acquisition module 103 acquires the design data based on the program. The acquisition module 103 stores the plug-in setting data acquired from the user terminal 20 in the plug-in database DB. It is assumed that the acquisition module 103 can acquire the plug-in setting data stored in the plug-in database DB at any time. For example, when the server 10 receives a request for displaying the portal page P5 from the user terminal 20, the acquisition module 103 can acquire the design data and the like on the portal page P5.

[Creation Module]

The creation module 104 creates the portal page P5 based on the design data acquired by the acquisition module 103. Creating the portal page P5 refers to creating final display data of the portal page P5 to be displayed on the user terminal 20. In the at least one embodiment, a browser is used, and hence creating HTML data of the portal page P5 corresponds to creating the portal page P5. When an application dedicated to the task support system 1 is used instead of the browser, creating final data such as image data to be transmitted to the application on the user terminal 20 corresponds to creating the portal page P5. The display control module 102 described above displays the portal page P5 created by the creation module 104.

For example, the creation module 104 creates the portal page P5 based on the portal page plug-in. The portal page plug-in includes a program for the creation module 104 to create the portal page P5. The creation module 104 creates the portal page P5 based on the program. In the at least one embodiment, a case in which, when the server 10 receives a display request for the portal page P5 from the user terminal 20, the creation module 104 dynamically creates display data of the portal page P5 on the spot based on the design data stored in the plug-in database DB is described. The creation module 104 may create in advance the display data of the portal page P5 before receiving the display request from the user terminal 20. The display data created in advance is recorded in the data storage unit 100. When the server 10 receives the display request from the user terminal 20, the display control module 102 may read out the display data recorded in the data storage unit 100 and transmit the display data to the user terminal 20.

In the at least one embodiment, a rough design of the portal page P5 is defined in the portal page plug-in. That is, a rough format of the portal page P5 is defined in the portal page plug-in. A detailed design of the portal page P5 varies depending on the design designated by the user on the design designation page P3. In the at least one embodiment, the user can designate not only the design of each link L50 but also other details such as the title and the description of the portal page P5. It is also defined in the portal page plug-in which parts of the format of the portal page P5 the global setting data and the design data are to be reflected in. Processing for arranging the links L50 by the creation module 104 is also defined in the portal page plug-in so that the links L50 are arranged in the order indicated by the design data.

In the at least one embodiment, the creation module 104 creates the portal page P5 based on the portal page plug-in added by the addition module 101. The creation module 104 creates the portal page P5 based on the portal page plug-in. The portal page plug-in includes a program for the creation module 104 to create the portal page P5. The creation module 104 creates the portal page P5 based on the program.

In the at least one embodiment, the creation module 104 adds an HTML tag that can identify the design data to the HTML portlet of the portal page P5, and creates the portal page P5 based on the HTML tag. In the example of FIG. 4, the user performs a predetermined copy operation on the design designation page P3. The copy operation may be any operation, and is not limited to an operation for selecting the button B36. For example, an operation for pressing a predetermined key on the keyboard, an operation for long-pressing a touch panel, an operation using a mouse, or an operation using voice input may correspond to the copy operation. The creation module 104 identifies which piece of design data to use to create the portal page P5 based on the HTML tag of the HTML portlet.

For example, when the HTML tag copied by the copy operation is pasted to the HTML portlet, the creation module 104 adds the HTML tag to the HTML portlet. In the example of FIG. 5, when a predetermined paste operation is performed on the input form F43 of the portlet page P4, the creation module 104 adds the HTML tag to the HTML portlet. The paste operation may be any operation, and an operation for pressing a predetermined key on the keyboard, an operation for tapping the touch panel, an operation using the mouse, or an operation using the voice input may correspond to the paste operation.

When the user does not perform the paste operation for the HTML tag on the HTML portlet, no information may be displayed on the portal page P5, or a default portal page P5 provided by an administrator of the task support system 1 may be displayed on the portal page P5. Further, when the user does not paste the HTML tag to the HTML portlet, the portal page P5 itself may be inhibited from being displayed.

For example, the creation module 104 creates the portal page P5 so that the links L50 are arranged in rows and columns corresponding to the order of the designation images I32 on the design designation page P3. The creation module 104 creates the portal page P5 by determining the arrangement of the links L50 so that the order of the designation images I32 on the design designation page P3 matches the order of the links L50 on the portal page P5. In the example of FIG. 4 and FIG. 6, the creation module 104 creates the portal page P5 so that the links L50 are arranged on the portal page P5 in the same order from the upper left as the order from the top to the bottom on the design designation page P3.

For example, the creation module 104 arranges, at the upper left on the portal page P5, the link L50A including the title and the description indicated by the input forms F320A and F321A of the first designation image I32A from the top on the design designation page P3, having the URL indicated by the input form F322A of the designation image I32A associated therewith, and having the background color indicated by the input form F323A of the designation image I32. In the same manner, the creation module 104 arranges the subsequent links L50B to L50F at the second to sixth positions on the portal page P5.

3-2. Functions Implemented by User Terminal

For example, the user terminal 20 includes a data storage unit 200, a display control module 201, and an operation receiving module 202. The data storage unit 200 is implemented by the storage unit 22. The display control module 201 and the operation receiving module 202 are implemented by the control unit 21.

[Data Storage Unit]

The data storage unit 200 stores data required for the user to use the task support system 1. For example, the data storage unit 200 stores a browser for displaying various pages of the task support system 1. For example, the data storage unit 200 stores an application dedicated to the task support system 1.

[Display Control Module]

The display control module 201 displays various pages of the task support system 1 on the display unit 25. For example, the display control module 201 displays, on the display unit 25, each of the top page P1, the plug-in page P2, the design designation page P3, the portlet page P4, the portal page P5, and the task support page P6 based on the display data received from the server 10.

[Operation Receiving Module]

The operation receiving module 202 receives an operation performed on each page displayed by the display control module 201. The user terminal 20 transmits details of the operation of the user to the server 10 as appropriate.

4. Processing to be Executed by Task Support System

Figure 11:
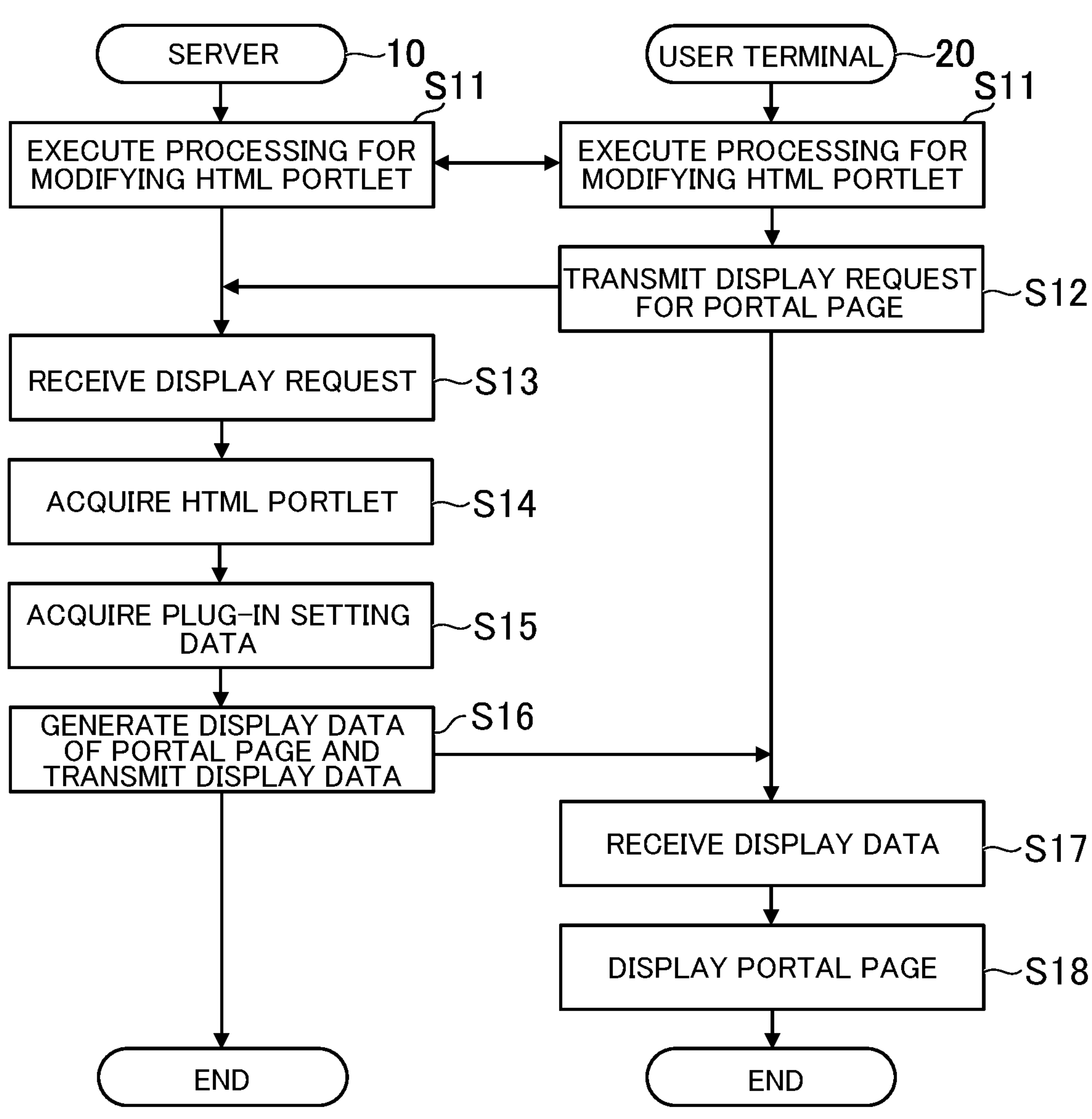
FIG. 11 is a flow chart for illustrating the example of processing to be executed by the task support system.

FIG. 10 and FIG. 11 are flow charts for illustrating an example of processing to be executed by the task support system 1. The control units 11 and 21 execute programs stored in the storage units 12 and 22, respectively, to thereby execute the processing of FIG. 10 and FIG. 11. It is assumed that the server 10 has already added, to the plug-in database DB, the portal page plug-in for the organization to which the user belongs.

The user terminal 20 cooperates with the server 10 to execute processing for displaying the design designation page P3 (Step S1). In Step S1, when the server 10 receives a display request for the design designation page P3 from the user terminal 20, the server 10 refers to the plug-in database DB to acquire the display data of the design designation page P3. It is assumed that the display data is stored in the plug-in database DB as a part of the plug-in. The server 10 transmits the display data of the design designation page P3 to the user terminal 20. In the at least one embodiment, Step S1 corresponds to a display control step of displaying the design designation page P3.

After the user terminal 20 displays the design designation page P3 on the display unit 25, the user terminal 20 identifies the operation of the user performed on the design designation page based on a detection signal from the operating unit 24 (Step S2). In this case, it is assumed that the user performs input to the input forms F30 and F31, performs input to the designation images I32, selects the button B33, selects the button B34, selects the button B36, or selects the button B37.

When the user performs input to the input forms F30 and F31 ("F30 AND F31" in Step S2), the user terminal 20 records, in the storage unit 22, the global setting data indicating global setting of the portal page P5 input by the user (Step S3). When the user performs input to the designation images I32 in Step S2 ("I32" in Step S2), the user terminal 20 records, in the storage unit 22, the design data indicating the designs of the links L50 designated by the user (Step S4). In Step S4, when the user selects the button B324 or B325 of the designation image I32, the user terminal 20 adds or deletes the designation image I32.

When the user selects the button B33 in Step S2 ("B33" in Step S2), the user terminal 20 cooperates with the server 10 to execute processing for saving the plug-in setting data (Step S5). In the at least one embodiment, the design data is included in the plug-in setting data, and hence Step S5 corresponds to an acquisition step of acquiring the plug-in setting data including the design data. When the user selects the button B34 in Step S2 ("B34" in Step S2), this process is ended. When the user selects the button B36 in Step S2 ("B36" in Step S2), the user terminal 20 copies the HTML tag (Step S6). It is assumed that, at a time point of Step S1, the server 10 generates an HTML tag and includes the HTML tag in the display data of the design designation page P3.

When the user selects the button B37 in Step S2 ("B37" in Step S2), the user terminal 20 cooperates with the server 10 to execute processing for displaying the portlet page P4 (Step S7). The user terminal 20 identifies the operation of the user based on a detection signal from the operating unit 24 (Step S8). In this case, it is assumed that the user performs input to the input forms F40 to F42, performs a paste operation on the input form F43, selects the button B44, or selects the button B45.

When the user performs input to the input forms F40 to F42 in Step S8 ("F40 TO F42" in Step S8), the user terminal 20 records, in the storage unit 22, data indicating a portlet name and the like input by the user (Step S9). When the user performs a paste operation on the input form F43 in Step S8 ("F43" in Step S8), the user terminal 20 pastes the HTML tag to the input form F43 (Step S10). When the user selects the button B45 in Step S8 ("B45" in Step S8), this process is ended.

When the user selects the button B44 in Step S8 ("B44" in Step S8), the process advances to FIG. 11, and the user terminal 20 cooperates with the server 10 to execute processing for modifying the HTML portlet (Step S11). In Step S11, the server 10 receives modified details of the HTML portlet from the user terminal 20, and updates the plug-in database DB. When the user selects a button B11, the user terminal 20 transmits a display request for the portal page P5 to the server 10 (Step S12).

When the server 10 receives the display request (Step S13), the server 10 refers to the plug-in database DB to acquire the HTML portlet of the portal page P5 (Step S14). The server 10 refers to the plug-in database DB to acquire the plug-in setting data input through the design designation page P3 based on the HTML tag included in the HTML portlet (Step S15). The server 10 generates display data of the portal page P5 based on the plug-in setting data acquired in Step S15, and transmits the display data to the user terminal 20 (Step S16). In the at least one embodiment, Step S16 corresponds to a creation step of creating the portal page P5.

In Step S16, the server 10 applies the title and the description indicated by the plug-in setting data to predetermined positions of the portal page P5. The server 10 arranges the links L50 on the portal page P5 so that the links L50 are arranged in the order of the design data included in the plug-in setting data. The server 10 generates display data of the portal page P5 through a series of those processing steps. When the user terminal 20 receives the display data of the portal page P5 from the server 10 (Step S17), the user terminal 20 displays the portal page P5 on the display unit 25 (Step S18), and this process is ended.

The task support system 1 according to the at least one embodiment displays the design designation page P3 that allows the user to designate the design of each link L50 afterward even without requiring the user to input the code of the portal page P5. The task support system 1 creates the portal page P5 based on the design data indicating the designs designated by the user on the design designation page P3. Thus, a user who has no knowledge of code such as HTML or CSS can customize the design of the link L50, thereby being able to increase the convenience of the user. Even from the viewpoint of a user who has knowledge of code, time and labor for the user to input code can be saved, thereby being able to increase the convenience. Even from the viewpoint of a user who uses the created portal page P5, the user can use the portal page P5 that is highly usable, thereby increasing task efficiency.

Further, when the user performs the predetermined addition operation, the task support system 1 adds the portal page plug-in to the task support system 1. The task support system 1 displays the design designation page P3, acquires the design data, and creates the portal page P5 based on the added plug-in. It is possible to implement a mechanism that allows the user to designate the design of the link L50 through the plug-in without requiring the user to input the code of the portal page P5. It suffices that, for example, only a user who requires the portal page plug-in performs the addition operation for the portal page plug-in, thereby eliminating waste of resources.

Further, the task support system 1 creates the portal page P5 so that the links L50 are arranged in rows and columns corresponding to the order of the designation images I32 on the design designation page P3. The order of the designation images I32 on the design designation page P3 corresponds to the order of the links L50 on the portal page P5, and hence it becomes intuitively easier for the user to grasp the design designation page P3. For example, it becomes unrequired for the user to perform alignment by drag-and-drop in a preview.

Further, the task support system 1 adds the HTML tag that can identify the design designated by the user to the HTML portlet of the portal page P5, and creates the portal page P5 based on the HTML tag. This simplifies an operation to be performed by the user, thereby being able to increase the convenience of the user. In addition, a developer of the task support system 1 can provide a mechanism for creating the portal page P5 by reusing an existing HTML portlet mechanism, thereby reducing the number of steps for development of the developer and stabilizing an operation of the task support system 1.

Further, when the HTML tag copied by the copy operation on the design designation page P3 is pasted to the HTML portlet, the task support system 1 adds the HTML tag to the HTML portlet. Accordingly, the user is only required to perform a simple operation such as the copy operation, thereby being able to increase the convenience of the user. This prevents the user from incorrectly inputting the HTML tag.

5. Modification Examples

The present disclosure is not limited to the examples of the at least one embodiment described above, and can be modified suitably without departing from the spirit of the present disclosure.

5-1. Modification Example 1

For example, the display control module 102 may display the design designation page P3 including a plurality of items of design data. This point is as described in the at least one embodiment. In the example of FIG. 4, there are four items, namely, the title of the link L50, the description of the link L50, the URL to be embedded in the link L50, and the background color of the link L50. Those four items may be items that are required to be input by the user, but in Modification Example 1, are assumed to be items that are optionally input (items that are not required to be input) by the user. This even allows the user to leave all the four items unfilled. The four items may be a mixture of items that are required to be input by the user and items that are optionally input by the user.

FIG. 12 is a view for illustrating an example of the portal page P5 in a case in which there are items left unfilled. The creation module 104 in Modification Example 1 creates the portal page P5 so that, even when there is an item left unfilled, an arrangement of a region corresponding to the item in the design of the link L50 remains unchanged. For example, the creation module 104 creates the portal page P5 so that, for the link L50 having an item left unfilled in the design data, the item left unfilled includes no information and the region corresponding to the item is maintained (for example, a region having a size determined in advance is secured). In the example of FIG. 12, the input forms F320C and F321F are left unfilled, and hence the title of the link L50C is not displayed, and the description of the link L50F is not displayed. However, in the link L50C, there is a region corresponding to the title left unfilled. In the link L50F, there is a region corresponding to the description left unfilled.

A method itself for the creation module 104 to determine the arrangement of the region corresponding to each item in the design of the link L50 may be the same as that in the at least one embodiment. A correspondence relationship between each individual item and a region within the design of the link L50 is determined in advance, and it suffices that the creation module 104 determines, based on the correspondence relationship, the arrangement of the region corresponding to each item in the design of the link L50. The creation module 104 in Modification Example 1 may create the portal page P5 by determining the arrangement of each item in the design of the link L50 irrespective of whether or not there is an item left unfilled. Further, the creation module 104 may create the portal page P5 so that the link L50 having an item left unfilled in the design data includes default information instead of including no information.

The task support system 1 according to Modification Example 1 creates the portal page P5 so that, even when there is an item left unfilled, the arrangement of the region corresponding to the item in the design of the link L50 remains unchanged. Accordingly, even when there is an item left unfilled by the user, the task support system 1 can create the portal page P5, thereby being able to increase the convenience of the user.

5-2. Modification Example 2

For example, a size of a window for displaying the portal page P5 can be freely changed by the user performing an operation such as dragging and dropping an edge of the window. In this regard, a technology for automatically changing the display in accordance with a change in size of the window is sometimes called "responsive web design."

For example, it is conceivable that the task support system 1 dynamically changes the arrangement of the links L50 through use of the responsive web design. In the example of FIG. 6, it is also conceivable that the task support system 1 changes the links L50 in two rows by three columns to those in three rows by two columns when a horizontal width of the window becomes shorter. In contrast, when the horizontal width of the window becomes longer, it is also conceivable that the task support system 1 changes the links L50 to those in four columns and displays only the links L50 up to the second column in the second row.

However, some users may intuitively remember an arrangement of the designs of the links L50 on the portal page P5, and hence when the task support system 1 automatically changes the arrangement of the designs of the links L50 in the responsive web design, usability of the user may rather deteriorate. In view of this, the creation module 104 may create the portal page P5 so that, even when the size of the window for displaying the portal page P5 is changed, the arrangement of the designs of the links L50 on the portal page P5 remains unchanged. The arrangement of the designs of the links L50 refers to a relative positional relationship between the links L50 on the portal page P5. In other words, the arrangement of the designs of the links L50 is the order of the links L50 on the portal page P5. For example, the order includes at least one of that in a row or that in a column.

The creation module 104 in Modification Example 2 creates the portal page P5 for which a function of the responsive web design has been turned off. This function itself may be any one of various publicly known functions. For example, the creation module 104 may create the portal page P5 without referring to a media query in CSS. The media query is a function of switching a style sheet to be applied depending on the display environment including the size of the window and a size of the display unit 25 itself.

For example, the creation module 104 creates the portal page P5 without referring to the media query, to thereby being able to create the portal page P5 that does not change the arrangement of the designs of the links L50 even when the size of the window is changed. However, when no media query is referred to, the size and the like of each link L50 are completely fixed. Thus, the creation module 104 may create the portal page P5 so that the arrangement of the designs of the links L50 is not automatically changed while the creation module 104 refers to the media query to automatically change the size of each link L50.

FIG. 13 is a view for illustrating an example of the portal page P5 in a case in which the size of the window is changed. The creation module 104 in Modification Example 2 may create the portal page P5 so that, when the size of the window is changed, the arrangement of the designs of the links L50 is not changed but the appearance of each link L50 is changed. For example, the creation module 104 may create the portal page P5 so that the horizontal width of the design of each link L50 becomes shorter when the horizontal width of the window becomes shorter. In contrast, the creation module 104 may create the portal page P5 so that the horizontal width of the design of each link L50 becomes longer when the horizontal width of the window becomes longer.

Further, in the above-mentioned examples, at least one of an upper limit value or a lower limit value of the horizontal width of the design of each link L50 may be determined. In the same manner, when the vertical width of the window is changed, the vertical width of the design of each link L50 may be dynamically changed. However, it is assumed that the arrangement of the designs of the links L50 on the portal page P5 remains unchanged. When the window becomes so small that the lower limit value of the horizontal width is reached, each link L50 no longer becomes smaller. When the links L50 does not fit, the window may be set horizontally scrollable.

The task support system 1 according to Modification Example 2 creates the portal page P5 so that, even when the size of the window for displaying the portal page P5 is changed, the arrangement of the designs of the links L50 on the portal page P5 remains unchanged. This can increase the convenience of the user who intuitively remembers the arrangement of the designs of the links L50.

5-3. Modification Example 3

For example, in the at least one embodiment, a case in which all the six links L50 have the same size as illustrated in FIG. 6 has been described. In the example of FIG. 6, the titles and the descriptions of the links L50 have similar numbers of characters, and hence the titles and the descriptions of all the links L50 fit even when the links L50 have the same size. Meanwhile, when the numbers of characters of the titles and the descriptions of the links L50 greatly differ between the links L50, the sizes of the links L50 may be different from each other in order to fit the characters having the numbers of characters.

For example, in a case in which the sizes of all the links L50 are different from each other, even when the links L50 are arranged in rows and columns, positions of edges of the links L50 do not align with each other, and visibility may deteriorate. In view of this, the creation module 104 may determine the size of the links L50 on a row-by-row basis or a column-by-column basis so that the visibility becomes higher. The creation module 104 in Modification Example 3 determines, on a row-by-row basis or a column-by-column basis, the width of the designs of the links L50 so as to match the width of the link L50 having the longest width.

FIG. 14 is a view for illustrating an example of the portal page P5 in Modification Example 3. For example, the creation module 104 creates the portal page P5 by determining, on a row-by-row basis, the vertical width of the designs of the links L50 so as to match the vertical width of the design of the link L50 having the longest vertical width on each row. In the example of the upper half of FIG. 14, the number of characters of the description of the link L50D is much larger than those of the other links L50A to L50C, L50E, and L50F. In this case, the creation module 104 creates the portal page P5 so that, for the second row, the vertical width of the designs of the links L50E and L50F on the same row matches the vertical width of the design of the link L50D having the longest vertical width.

The creation module 104 may create the portal page P5 by determining, on a column-by-column basis, the horizontal width of the designs of the links L50 so as to match the horizontal width of the design of the link L50 having the longest horizontal width on each column. The portal page P5 for this case is illustrated as the example of the lower half of FIG. 14. In the example of the lower half of FIG. 14, the number of characters of the description of the link L50A is somewhat longer than those of the other links L50B to L50F. In this case, the creation module 104 creates the portal page P5 so that, for the first column, the horizontal width of the design of the link L50D on the same column matches the horizontal width of the design of the link L50A having the longest horizontal width.

The task support system 1 according to Modification Example 3 creates the portal page P5 by determining, on a row-by-row basis or a column-by-column basis, the width of the designs of the links L50 so as to match the width of the design of the link L50 having the longest width. Accordingly, the visibility of the portal page P5 can be enhanced.

5-4. Modification Example 4

For example, the creation module 104 may be able to create a plurality of portal pages P5. That is, the creation module 104 may be able to create a plurality of portal pages P5 in the same organization. A flow in which the creation module 104 creates each individual portal page P5 may be the same as that in the at least one embodiment. The creation module 104 may be able to create a plurality of portal pages P5 through one portal page plug-in, but in Modification Example 4, it is assumed that one portal page P5 can be created by the creation module 104 through one portal page plug-in. Thus, the addition module 101 adds as many portal page plug-ins as the number of portal pages P5 desired to be created by the user.

In Modification Example 4, the user designates a design for each portal page P5. Design data for creating each individual portal page P5 may be the same as that in the at least one embodiment. The server 10 stores, in the plug-in database DB, plug-in setting data including the design data for each individual portal page P5. The creation module 104 adds the HTML tag to the HTML portlet for each portal page P5. A flow of adding the HTML tag for each individual portal page P5 may also be the same as that in the at least one embodiment.

The task support system 1 according to Modification Example 4 adds the HTML tag to the HTML portlet for each portal page P5. Accordingly, even when the user is required to create a plurality of portal pages P5, the user is not required to input code for any portal page P5, thereby being able to increase the convenience of the user.

5-5. Modification Example 5

For example, as described in the at least one embodiment, the task support system 1 may allow the user to input code to the HTML portlet. In the example of FIG. 5, the user can input code to the input form F43 of the portlet page P4. The user may be allowed to input code to another input form different from the input form F43 on the portlet page P4 or to another page different from the portlet page P4.

The creation module 104 in Modification Example 5 creates the portal page P5 based on the design data acquired by the acquisition module 103 and the code input by the user to the HTML portlet. The creation module 104 determines details of the links L50 on the portal page P5 based on the design data, and determines other details based on the code. When the user inputs code representing the designs of the links L50, the creation module 104 prioritizes any one of the design data or the code. Which one is to be prioritized by the creation module 104 is only required to be determined in advance by the developer of the task support system 1. For example, of a position at which the HTML tag is pasted in the input form F43 and a position at which the code representing the designs of the links L50 is described, priority may be given to the latter one in order.

The task support system 1 according to Modification Example 5 creates the portal page P5 based on the design data and the code input to the HTML portlet. Accordingly, the task support system 1 can create the portal page P5 having a high degree of freedom. In addition, the developer of the task support system 1 can provide a mechanism for creating the portal page P5 by reusing an existing HTML portlet mechanism, thereby being able to reduce the number of steps for development and stabilize the operation of the task support system 1.

5-6. Modification Example 6

For example, as described in the at least one embodiment, the display control module 102 displays the design designation page P3 on which the designation images I32 for the user to designate the designs are arranged. Further, the creation module 104 determines the arrangement of the links L50 on the portal page P5 based on the order of the designation images I32 on the design designation page P3. Those processing steps are as described in the at least one embodiment. In Modification Example 6, it is assumed that the order of the designation images I32 can be changed by a simple operation.

FIG. 15 is a view for illustrating an example of how the order of the designation images I32 is changed. The display control module 102 in Modification Example 6 changes the order when the user performs a predetermined order change operation. In the example of FIG. 15, a case in which the drag-and-drop corresponds to the order change operation is described, but the order change operation may be any operation, and is not limited to the example of FIG. 15. For example, the order change operation may be an operation for selecting a button for moving the designation image I32 in the vertical direction, a click, a double click, a flick, a long press, or an operation for selecting a predetermined key on the keyboard.

In the example of FIG. 15, only some reference symbols are illustrated. For example, it is assumed that, on the design designation page P3 in the upper half of FIG. 15, the user has dragged the designation image I32E and dropped the designation image I32E onto the designation image I32B. In this case, as on the design designation page P3 in the lower half of FIG. 15, the design indicated by the design data relating to the set of company rules indicated by the designation image I32E before the drag-and-drop is displayed in the designation image I32B. The pieces of design data relating to the leave application, the expense reimbursement, and the facility reservation indicated by the designation images I32B to I32D, respectively, before the drag-and-drop are each shifted down in order position by one.

FIG. 16 is a view for illustrating another example of the order change operation. As illustrated in FIG. 16, the user terminal 20 displays a preview PV39 of the portal page P5 on the design designation page P3 when the user selects a button B38 of the design designation page P3. Details of the preview PV39 are the same as those of the portal page P5. The user terminal 20 displays the preview PV39 in the same manner as the portal page P5.

For example, the order change operation may be an operation for the user to move any one of links L390A to L390F in the preview PV39. In the example of FIG. 16, a case in which the drag-and-drop of the link L390D corresponds to the order change operation is described, but the order change operation is not limited to the drag-and-drop as described above. For example, when the user drags and drops the link L390D onto the link L390B, the link L390B at a drop destination and the subsequent link are automatically moved.

Positions of the respective links L390A to L390F in the preview PV39 are determined in advance. Thus, the positions of the links L390A to L390F are determined once an order thereof is determined. That is, places in which the respective links L390A to L390F are planned to be arranged are set in advance, and hence, once the order of the links L390A to L390F is determined, the places (positions or actual arrangement places) in which the respective links L390A to L390F are arranged are determined. When the link L390B at the drop destination and the subsequent link are automatically moved, the user is no longer required to move the link L390B at the drop destination and the link L390C to other places by drag-and-drop. A series of those steps of display control is executed by the display control module 102 or the display control module 201.

The task support system 1 according to Modification Example 6 changes the order of the designation images I32 on the design designation page P3 when the user performs the order change operation. Accordingly, the task support system 1 can reduce an operation load on the user.

5-7. Other Modification Examples

For example, Modification Examples 1 to 6 may be combined.

For example, in the at least one embodiment, a case in which the task support system 1 creates the portal page P5 through use of the portal page plug-in has been described, but the task support system 1 may provide the user with a function of creating the portal page P5 as a default function of the task support system 1 instead of the portal page plug-in. In this case, the user uses the function of creating the portal page P5 by the task support system 1 as the default function without requiring the addition operation.

For example, the links L50 may be arranged at any positions by the user instead of being arranged so as to be aligned in rows and columns. For example, only one link L50 may be included in the portal page P5. For example, the server 10 or the user terminal 20 may automatically paste the HTML tag to the HTML portlet even without the user performing the paste operation. For example, the server 10 may create display data of the portal page P5 based on the design data input to the design designation page P3 without using the HTML portlet.

For example, each function described above may be implemented by any device in the task support system 1. For example, the functions described as being implemented by the server 10 may be implemented by the user terminal 20. In this case, it suffices that the same function as the server 10 is implemented by being executed by a script of the browser or by being executed by an application installed in the user terminal 20. For example, the functions described as being implemented by the user terminal 20 may be implemented by the server 10. For example, the functions may be implemented by one computer instead of being shared by a plurality of computers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A task support system, comprising at least one processor configured to add a plugin to a storage area corresponding to an organization to which a user belongs when the user performs a predetermined additional operation, wherein the plugin includes:

a first program for displaying a design designation page that allows the user to designate designs of links without requiring the user to input code of a portal page of the organization including links to task support pages that support tasks in the organization;

a second program for acquiring design data indicating the designs designated by the user on the design designation page; and a third program for creating the portal page of the organization including the links;

wherein the at least one processor is further configured to:

display the design designation page based on the first program of the plugin added to the storage area corresponding to the organization to which the user belongs;

acquire, based on the second program of the plugin added to the storage area corresponding to the organization to which the user belongs, the design data from a user terminal of the user, store the design data in the storage area corresponding to the organization to which the user belongs, and acquire the design data from the storage area; and create, based on the third program of the plugin added to the storage area corresponding to the organization to which the user belongs, the portal page including the links having the designs indicated by the design data.

2. The task support system according to claim 1, wherein the at least one processor is configured to:

display the design designation page including a plurality of items; and create the portal page so that, even when an item left unfilled exists, an arrangement of a region corresponding to the item in the design of each of the links remains unchanged.

3. The task support system according to claim 1, wherein the at least one processor is configured to create the portal page so that, even when a size of a window for displaying the portal page is changed, an arrangement of the designs of the links on the portal page remains unchanged.

4. The task support system according to claim 1, wherein the links are arranged on the portal page in a plurality of rows and in a plurality of columns, and wherein the at least one processor is configured to:

display the design designation page on which designation images for the user to designate the designs are arranged; and create the portal page so that the links are arranged in rows and columns that correspond to an order of the designation images on the design designation page.

5. The task support system according to claim 4, wherein the at least one processor is configured to determine a width of the designs of the links on one of a row-by-row basis or a column-by-column basis so as to match a width of the design of one of the links that has the longest width.

6. The task support system according to claim 1, wherein the at least one processor is configured to add, to an HTML portlet of the portal page, an HTML tag with which the designs of the links designated by the user are identifiable, and create the portal page based on the HTML tag.

7. The task support system according to claim 6, wherein the user performs a predetermined copy operation on the design designation page, and wherein the at least one processor is configured to add the HTML tag to the HTML portlet when the HTML tag copied by the predetermined copy operation is pasted to the HTML portlet.

8. The task support system according to claim 6, wherein the at least one processor is configured to create a plurality of portal pages, wherein the user designates the designs for each of the plurality of portal pages, and wherein the at least one processor is configured to add the HTML tag to the HTML portlet for each of the plurality of portal pages.

9. The task support system according to claim 6, wherein the user is allowed to input the code to the HTML portlet in the task support system, and wherein the at least one processor is configured to create the portal page based on the acquired design data and the code input to the HTML portlet by the user.

10. The task support system according to claim 1, wherein the at least one processor is configured to:

display the design designation page on which designation images for the user to designate the designs are arranged;

determine an arrangement of the links on the portal page based on an order of the designation images on the design designation page; and change the order when the user performs a predetermined order change operation.

11. A task support method, comprising:

adding a plugin to a storage area corresponding to an organization to which a user belongs when the user performs a predetermined additional operation, wherein the plugin includes:

a first program for displaying a design designation page that allows the user to designate designs of links without requiring the user to input code of a portal page of the organization including links to task support pages that support tasks in the organization;

a second program for acquiring design data indicating the designs designated by the user on the design designation page; and a third program for creating the portal page of the organization including the links;

displaying the design designation page based on the first program of the plugin added to the storage area corresponding to the organization to which the user belongs;

acquiring, based on the second program of the plugin added to the storage area corresponding to the organization to which the user belongs, the design data from a user terminal of the user, store the design data in the storage area corresponding to the organization to which the user belongs, and acquire the design data from the storage area; and creating, based on the third program of the plugin added to the storage area corresponding to the organization to which the user belongs, the portal page including the links having the designs indicated by the design data.

12. A non-transitory information storage medium having stored thereon a program for causing a computer to:

add a plugin to a storage area corresponding to an organization to which a user belongs when the user performs a predetermined additional operation, wherein the plugin includes:

a first program for displaying a design designation page that allows the user to designate designs of links without requiring the user to input code of a portal page of the organization including links to task support pages that support tasks in the organization;

a second program for acquiring design data indicating the designs designated by the user on the design designation page; and a third program for creating the portal page of the organization including the links;

display the design designation page based on the first program of the plugin added to the storage area corresponding to the organization to which the user belongs;

acquire, based on the second program of the plugin added to the storage area corresponding to the organization to which the user belongs, the design data from a user terminal of the user, store the design data in the storage area corresponding to the organization to which the user belongs, and acquire the design data from the storage area; and create, based on the third program of the plugin added to the storage area corresponding to the organization to which the user belongs, the portal page including the links having the designs indicated by the design data.

* * * * *